US011978955B2

(12) United States Patent
Stevenson et al.

(10) Patent No.: US 11,978,955 B2
(45) **Date of Patent: *May 7, 2024**

(54) METASURFACE ANTENNAS MANUFACTURED WITH MASS TRANSFER TECHNOLOGIES

(71) Applicant: Kymeta Corporation, Redmond, WA (US)

(72) Inventors: Ryan A. Stevenson, Woodinville, WA (US); Mohsen Sazegar, Kirkland, WA (US); Cagdas Varel, Seattle, WA (US); Seyed Mohamad Amin Momeni Hasan Abadi, Redmond, WA (US); Steven Howard Linn, Hillsboro, OR (US); Hussein Esfahlani, Redmond, WA (US); Witold Teller, Kirkland, WA (US)

(73) Assignee: KYMETA CORPORATION, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/956,547

(22) Filed: Sep. 29, 2022

(65) Prior Publication Data

US 2023/0127172 A1 Apr. 27, 2023

Related U.S. Application Data

(63) Continuation of application No. 16/991,924, filed on Aug. 12, 2020, now Pat. No. 11,489,266.
(Continued)

(51) Int. Cl.
*H01Q 15/00* (2006.01)
*H01Q 3/34* (2006.01)
(Continued)

(52) U.S. Cl.
CPC ........... *H01Q 15/0033* (2013.01); *H01Q 3/34* (2013.01); *H01Q 5/314* (2015.01); *H01Q 9/14* (2013.01);
(Continued)

(58) Field of Classification Search
CPC ............... H01Q 15/0033; H01Q 5/314; H01Q 15/0086; H01Q 1/241; H01Q 3/34;
(Continued)

(56) References Cited

U.S. PATENT DOCUMENTS 4,229,754 A 10/1980 French
5,355,577 A 10/1994 Cohn
(Continued)

FOREIGN PATENT DOCUMENTS

JP 2006-287970 A 10/2006
JP 2008-136219 A 6/2008
(Continued)

OTHER PUBLICATIONS

Indian Office Action and Search Report on the Patentability of Application No. 202247006456 dated Jan. 4, 2023, 5 pages.
(Continued)

*Primary Examiner* — Vibol Tan
(74) *Attorney, Agent, or Firm* — Womble Bond Dickinson (US) LLP

(57) ABSTRACT

A unit cell can be used for a metasurface, metamaterial, or beamforming antenna. The unit cell includes a metal layer attached to a substrate. The metal layer defines an iris opening for the unit cell. One or more tunable capacitance devices are positioned within or across the iris opening. Each tunable capacitance device is to tune resonance frequency of the unit cell. Mass transfer technologies or self-assembly processes may be used to position the tunable capacitance devices.

20 Claims, 25 Drawing Sheets

Related U.S. Application Data

(60) Provisional application No. 62/887,239, filed on Aug. 15, 2019.

(51) Int. Cl.

| | |
|---|---|
| ***H01Q 5/314*** | (2015.01) |
| ***H01Q 9/14*** | (2006.01) |
| ***H01Q 13/10*** | (2006.01) |
| ***H01Q 13/18*** | (2006.01) |
| ***H01Q 13/20*** | (2006.01) |
| ***H01Q 21/08*** | (2006.01) |

(52) U.S. Cl.
CPC ........... *H01Q 13/103* (2013.01); *H01Q 13/18* (2013.01); *H01Q 13/206* (2013.01); *H01Q 15/0086* (2013.01); *H01Q 21/08* (2013.01)

(58) Field of Classification Search
CPC .... H01Q 21/0012; H01Q 3/28; H01Q 21/064; H01Q 3/46
See application file for complete search history.

(56) References Cited

U.S. PATENT DOCUMENTS

| | | | | |
|---|---|---|---|---|
| 8,908,251 | B2 * | 12/2014 | Sayyah | G02F 1/0018 359/254 |
| 9,450,310 | B2 | 9/2016 | Bily et al. | |
| 9,786,986 | B2 | 10/2017 | Johnson et al. | |
| 9,893,435 | B2 | 2/2018 | Bily et al. | |
| 10,103,445 | B1 | 10/2018 | Gregoire et al. | |
| 10,367,269 | B2 | 7/2019 | Bily et al. | |
| 10,727,609 | B2 * | 7/2020 | Chen | H01P 7/082 |
| 10,938,120 | B2 * | 3/2021 | Rogers | H01Q 1/247 |
| 10,998,628 | B2 | 5/2021 | Chen et al. | |
| 11,038,269 | B2 * | 6/2021 | Quarfoth | H01Q 3/34 |
| 2004/0164912 | A1 | 8/2004 | Lindenmeier et al. | |
| 2004/0227667 | A1 | 11/2004 | Sievenpiper | |
| 2012/0326944 | A1 | 12/2012 | Choi et al. | |
| 2015/0380824 | A1 | 12/2015 | Aligodarz et al. | |
| 2016/0011307 | A1 | 1/2016 | Casse et al. | |
| 2016/0372834 | A1 | 12/2016 | Bily et al. | |
| 2017/0170557 | A1 | 6/2017 | Shipton et al. | |
| 2018/0076521 | A1 | 3/2018 | Mehdipour et al. | |
| 2018/0131103 | A1 | 5/2018 | Bily et al. | |
| 2018/0159245 | A1 | 6/2018 | Chen et al. | |
| 2020/0083605 | A1 | 3/2020 | Quarfoth et al. | |

FOREIGN PATENT DOCUMENTS

| | | | |
|---|---|---|---|
| JP | 2013-539949 | A | 10/2013 |
| JP | 2018-505625 | A | 2/2018 |
| KR | 10-2013-0007690 | A | 1/2013 |
| TW | 200819716 | A | 5/2008 |

OTHER PUBLICATIONS

International Preliminary Report on Patentability received for PCT Patent Application No. PCT/US20/46650, dated Feb. 24, 2022, 9 pages.
International Search Report and Written Opinion received for PCT Patent Application No. PCT/US20/46650, dated Nov. 23, 2020, 11 pages.
Liquid-crystal-tunable metasurface antennas (Year: 2017).
Tawianese Office Action and Search Report on the Patentability of Application No. 109127755 dated Nov. 3, 2021, 6 pages.
Tunable microwave metasurfaces for high-performance operations: dispersion compensation and dynamical switch (Year: 2016).
Notice of Reasons for Refusal received for Japanese Patent Application No. 2022-509102, dated Jan. 18, 2024, 12 pages (6 pages of English Translation and 6 pages of Original Document).
Partial European Search Report received for European Application No. 20851522.1, dated Jul. 24, 2023, 15 pages.
Supplementary European Search Report and Search Opinion received for European Application No. 20851522.1, dated Oct. 30, 2023, 14 pages.
Office Action received for Korean Patent Application No. 10-2022-7007946, mailed Feb. 16, 2024, 10 pages.

* cited by examiner

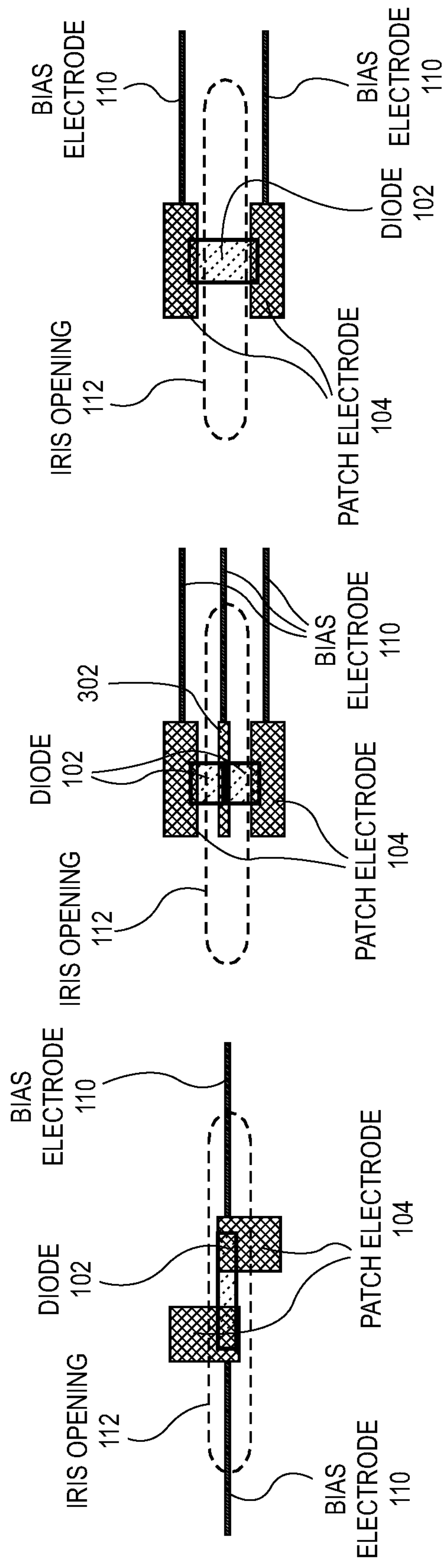
FIG. 3A
FIG. 3B
FIG. 3C
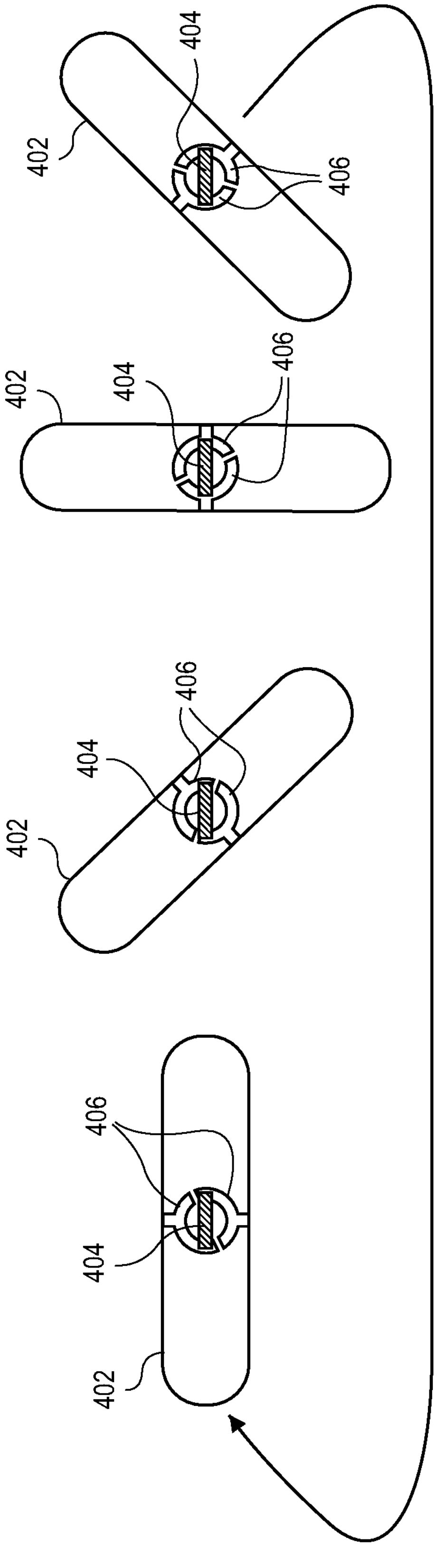
FIG. 4

CIRCULAR PART BOTTOM VIEW

CROSS-SECTION OF AN UNPACKAGED CIRCULAR DIODE

CROSS-SECTION OF A CIRCULAR DIODE PACKAGE

METASURFACE ANTENNAS MANUFACTURED WITH MASS TRANSFER TECHNOLOGIES

RELATED APPLICATION

The present application is a continuation of U.S. patent application Ser. No. 16/991,924 filed Aug. 12, 2020, and entitled "METASURFACE ANTENNAS MANUFACTURED WITH MASS TRANSFER TECHNOLOGIES," which claims the benefit of U.S. Provisional Patent Application No. 62/887,239 filed Aug. 15, 2019 and entitled "Metasurface Antennas Manufactured with Mass Transfer Technologies", which is incorporated by reference in its entirety.

FIELD OF THE INVENTION

Embodiments of the invention are related to wireless communication; more particularly, embodiments of the invention are related to wireless antennas that utilize devices manufactured with mass transfer technologies.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

By using simpler elements as compared to phased arrays, the operation of a metasurface is easier and faster. These elements, however, do not exhibit the same level of control as is achievable with phase shifters and amplifiers, common to phased array architectures. Some implementations of metasurface-based antennas do not provide independent control of both the magnitude and phase of each individual element in the array. Such control is desired at times.

SUMMARY

Various embodiments of unit cells, rotations of cells, arrays, tunable capacitance devices, apertures, segmentation of apertures, templates, assembly and self-assembly methods for manufacture, mass transfer techniques, drive circuitry, metasurface antennas, metamaterial antennas, beamforming antennas, assemblies and components are described herein.

One embodiment is a unit cell for a metasurface, metamaterial or beamforming antenna. The unit cell has a substrate and a metal layer attached to the substrate. The metal layer defines an iris opening. One or more tunable capacitance devices are positioned within or across the iris opening. Each tunable capacitance device is for tuning for resonant frequency of the unit cell.

One embodiment is an antenna. The antenna has one or more substrates defining an antenna aperture. The antenna aperture has a plurality of unit cells. Each unit cell has a metal layer attached to a portion of the one or more substrates. The metal layer defines an iris opening. One or more tunable capacitance devices are positioned within or across the iris opening. Each tunable capacitance device is tunable for resonance frequency of the unit cell. The one or more tunable capacitance devices of the unit cells have uniform orientation across at least a portion of the antenna aperture.

One embodiment is a method of making an antenna, component of an antenna, or electronically scanned array. The method includes placing unit cells on a substrate. Each unit cell has a metal layer attached to the substrate and defines an iris opening. One or more tunable capacitance devices are positioned within or across the iris opening. Each tunable capacitance device is to tune resonance frequency of the unit cell. The method includes attaching the one or more tunable capacitance devices as part of completing each of the plurality of unit cells.

One embodiment is a method of fabricating an electronically scanned array using mass transfer technologies. The method includes providing a substrate having a metal layer. The metal layer is attached to the substrate, and defines iris openings. A self-assembly process is used to align one or more tunable capacitance devices with respect to each of the iris openings. The one or more capacitance devices are coupled to the substrate while aligned with respect to the iris openings.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3A is a top view of a unit cell design that does not require thru vias.

FIG. 3B is a top view of a further unit cell design that does not require thru vias.

FIG. 3C is a top view of a further unit cell design that does not require thru vias.

FIG. 4 is a top view of a half-round disk unit cell that allows keeping the diode rotation uniform while the remainder of the unit cell can have different rotations.

DETAILED DESCRIPTION

Figure 1A:
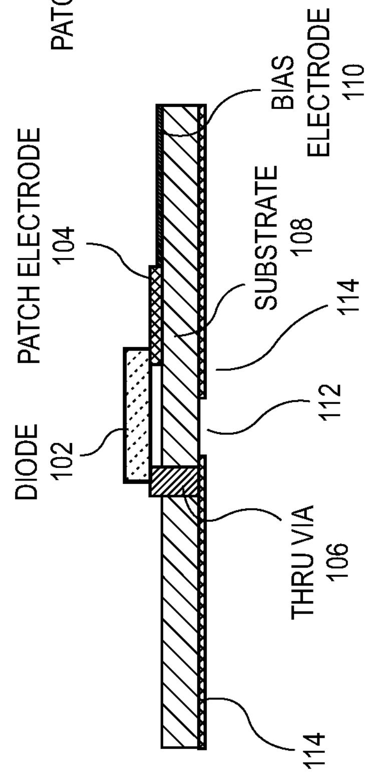
FIG. 1A is a cross section view of a unit cell design that is implemented and tuned by using bias electrodes and thru vias, for an embodiment of a metasurface antenna.

An improved design for metasurface elements, and more specifically tunable components, of metasurface or metamaterial antennas is described herein in various embodiments. A method for making metasurface elements, and more specifically tunable components, of metasurface or metamaterial antennas is described herein in various embodiments. The various designs are for arrays of iris openings and unit cells on substrates, and use diodes as varactors to tune resonant frequency of the iris openings. Design and placement of metasurface elements in a metasurface or metamaterial antenna govern the functionality and performance of the antenna.

Generally described, aspects of the present application correspond to systems, methods and apparatus related to tunable metasurface antennas, such as for use in holographic beam forming. The metasurface antennas may be manufactured with mass transfer technologies. Illustratively, mass transfer can include a number of different methodologies and techniques to manufacture high-resolution, direct-view displays with discrete components. Mass transfer techniques will allow the transfer of thousands or millions of components or packages, such as tunable components, onto a substrate in a single placement activity for application to radio frequency ("RF") applications. Such an approach facilitates massive scalability with discrete components. Without limitation, the tunable components can include, but are not limited to, micro-electro-mechanical systems ("MEMS"), Varactor diodes, PIN diodes, MOSFET/BJT/HEMT, dual diode (varactor), and Ferroelectric diodes.

Aspects of the present application relate to application of mass transfer technologies and techniques to antenna manufacturing. In one aspect, the application of mass transfer technologies corresponds to antenna design. To implement discrete varactor diode or other tunable components, the antenna array or the antenna elements are designed in a way that allows the implementation of discrete components. At the same time, the performance parameters of the antenna such as, for example, but not limited to, the radiation efficiency are taken into consideration. Several antenna element designs will be described in detail below.

In another aspect, the application of mass transfer technologies and techniques are applied to bias circuitry. A tunable metasurface antenna incorporates a bias network that can control antenna elements on the array, such as individual control of the antenna elements. The components of a metasurface antenna, and their associated locations, are designed to not interfere with the radio-frequency (RF) signal of the antenna. Several bias circuitry components will be described in detail below.

In a further aspect, the application of mass transfer technologies and techniques can correspond to integration and topology methodologies. Integration and topology methodologies correspond generally to facilitating the interoperability of components of the mass manufacture antenna. Several integration and topology methodologies will be described below with regard to single layer substrates, multi-layer boards as well as multi-layer thin films on a single substrate.

In yet another aspect, the application of mass transfer technologies and techniques can impact scalability, and several scalability aspects will be described in detail below.

In one embodiment, a metamaterial antenna has discrete tunable antenna elements that are assembled with micrometer or millimeter scale parts coming from different processes. For example, in one embodiment, diodes produced on GaAs substrates need to be assembled onto a glass substrate with a TFT (thin film transistor) matrix. Such an assembly can be accomplished with a traditional pick-and-place method where individual discrete components are placed on a substrate. For example, individual components may be picked up with a robotic arm and placed onto an assembly site on the glass substrate. However, traditional pick-and-place methods correspond to a serial assembly process that requires a long assembly time and high cost.

Pick-and-place methods become inefficient especially for small and thin parts where undesirable adhesion can occur due to electrostatic forces, van der Waals interaction or surface tension. Additionally, a serial pick-and-place method becomes much slower when features being assembled are not placed with respect to rectangular grid. This is a serious concern for a metasurface or metamaterial antenna since antenna features are repeated in a radial grid.

In other embodiments, discrete elements can be assembled in a parallel process which is often referred to as "self-assembly." Self-assembly is a stochastic process where energy, for example agitation, is applied to the system to create free parts, for example unassembled parts moving on a glass substrate, which will interact with their surroundings to find a low energy state, for example parts assembling to trenches matching to their shape on a glass substrate. Self-assembly processes also don't depend on a rectangular grid to operate efficiently.

Antenna Design

Figure 1B:
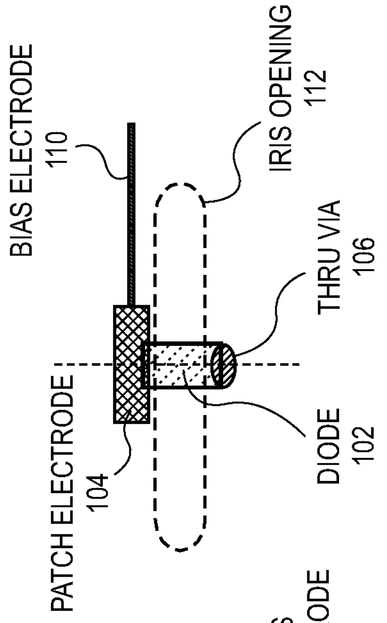
FIG. 1B is a top view of the unit cell design of FIG. 1A, for an embodiment of a metasurface antenna.

In one aspect, multiple antenna unit cell designs include an iris opening (or slot) and patch as the core antenna components. A metasurface or metamaterial antenna has many such iris openings and unit cells, for example an array (or multiple arrays) of iris openings and unit cells. With reference to FIGS. 1A and 1B, a unit cell is loaded (connected) with a diode to make the resonance frequency of the unit cell tunable. That is, the diode tunes the unit cell. A bias line is used to bring the required tuning voltage to the varactor. Plated thru vias are used as an electrical RF connection between the diode and the iris metallization as well as a DC connection ground for the diode. Note that while the term "connection" and "connected" are used throughout the specification, the components that are connected may be coupled together with one or more other intervening elements while still having an electrical connection.

FIG. 1A is a cross section view of a unit cell design that is implemented and tuned by using bias electrode 110 and thru via 106, for an embodiment of a metasurface antenna. In this embodiment, a diode 102 is operated as a varactor (i.e., a variable, voltage-controlled capacitor) to tune the resonance frequency of the unit cell. In one embodiment, one terminal of the diode 102 is connected through substrate 108 to iris metal 114 using thru via 106, and another terminal of the diode is connected to a patch electrode 104. Voltage applied across these two terminals of the diode 102 controls the capacitance of the varactor. In one embodiment, both the patch electrode 104 and a bias electrode 110 connected to the patch electrode 104 are mounted to the substrate 108 (e.g., glass, flexible substrates, printed circuit board (PCB), with the diode 102 connected to a portion of the top of the patch electrode 104 and the thru via 106, and thus the diode 102 is coupled to but spaced apart from the substrate 108. Iris metal 114 is attached to the bottom of the substrate 108 and forms an iris opening (or slot) 112 below the diode 102.

In operation, the effective electromagnetic properties of each unit cell of FIG. 1A, as well as other unit cell designs herein, can be controlled with dropping a voltage on the diode 102 (e.g., varactor diode), which is used as a voltage tunable capacitor for an RF radiating antenna element. Changing the diode voltage results in a change in the capacitance which in turn shifts the resonance of the resonator (i.e., the antenna element). In other words, changing the diode voltage produces changes in the effective capacitance of the radiating antenna element, and the change in effective capacitance changes the behavior of the radiating element. In this way, the varactor diode is a tuning element for the radiating antenna elements in beam formation. Thus, adjusting the voltage of the diode, adjusts the resonance of the antenna element to effect beam formation.

FIG. 1B is a top view of the unit cell design of FIG. 1A, for an embodiment of a metasurface antenna. The diode 102 spans across an iris opening 112 formed in iris metal 114 attached to the substrate 108 (see also FIG. 1A). In some embodiments, the iris opening 112 is an elongated shape having parallel sides and rounded ends, resembling an elongated flattened oval. Alternatively, the iris opening 112 does not have rounded ends and/or parallel sides. Further shapes for an iris opening 112 may be devised for further embodiments. The patch electrode 104, connected to one terminal of the diode 102, is to one side of the iris opening 112, and the thru via 106, connected to the other terminal of the diode 102, is to the opposing side of the iris opening 112. To avoid interfering with RF waves at the iris opening 112, the bias electrode 110 connected to the patch electrode 104 is also to the one side of the iris opening 112, and does not pass across the iris opening 112.

Alternative embodiments of a unit cell designs are illustrated in FIGS. 2, 3A, 3B and 3C. The embodiments shown in FIG. 2 incorporate thru vias. FIG. 1B may be implemented using thru vias as well. The embodiments illustrated in FIGS. 3A, 3B and 3C do not includes vias to couple a diode to the iris metal layer. The elimination of vias can facilitate manufacturing efficiency and cost.

Figure 2:
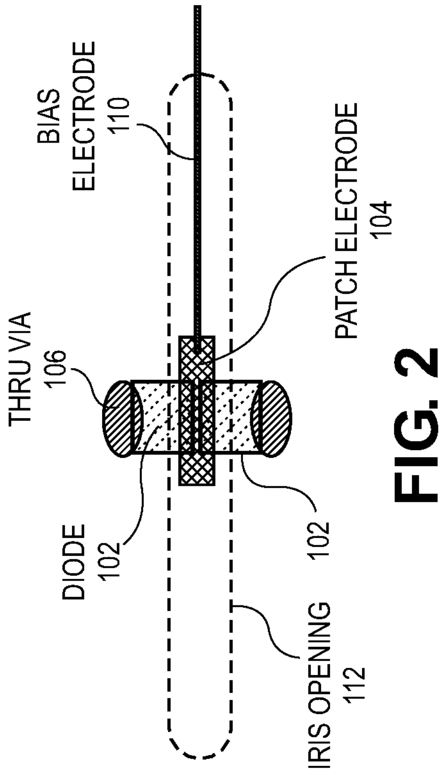
FIG. 2 is a top view of a unit cell design using thru vias.

FIG. 2 is a top view of a unit cell design using thru vias 106. This design features two diodes 102, end-to-end or back-to-back, and perpendicular to and spanning the iris opening 112. The two diodes 102 each have one terminal connected to the patch electrode 104 (on the patch layer), which is then connected to the bias electrode 110. In one embodiment, the bias electrode 110 runs lengthwise down the middle of the iris opening from the center of the iris opening 112 to and past one elongated end of the iris opening 112. In this arrangement, the iris opening 112 and the two diodes 102 are symmetric about the bias electrode 110. The other terminal of each diode 102 is connected to a respective to iris metal using a through via 106 (i.e., two thru vias 106, one to each side of the iris opening 112). The two diodes 102 as varactors in this configuration are creating two capacitors in series, each varactor having capacitance C, which combined can be considered as half of the capacitance, C/2. The operation of such circuit is similar to a single varactor configuration. The values of each capacitance can be doubled so that the combined capacitance value is the same as a single varactor. One key advantage of the double varactor design is that a bias line can be inserted without an impact on the RF characteristics. Other designs have a resistive bias line to decouple the DC circuit from RF.

FIG. 3A is a top view of a unit cell design that does not require thru vias. In this design, a diode 102 is oriented lengthwise along, parallel to and in the middle of an iris opening 112. There are two patch electrodes 104 of a patch layer, one connected to each end and respective terminal of the diode 102. There are two bias electrodes 110, one connected to each respective patch electrode 104 and running out lengthwise along the centerline and past the respective end of the iris opening 112.

FIG. 3B is a top view of a further unit cell design that does not require thru vias. Similar to the unit cell design in FIG. 2, this design features two diodes 102 that are connected end-to-end and span the iris opening 112. One bias electrode 110 running along a centerline of the iris opening 112 connects to a patch electrode that is connected to an electrode 302, also along the centerline, that connects to the facing terminals of the diodes 102. Opposing terminals of the diodes 102 each have a connection to a respective patch electrode 104 and bias electrode 110, with these bias electrodes 110 being parallel to the centerline bias electrode 110 but to either side of the iris opening 112.

FIG. 3C is a top view of a further unit cell design that does not require thru vias. Similar to unit cell designs in FIGS. 1A and 1B, this unit cell design features a single diode 102 spanning across an iris opening. Each terminal of the diode 102 has a connection to a respective patch electrode 104 and bias electrode 110. These two bias electrodes 110 run out parallel to and to either side of the iris opening 112 and do not run across or otherwise obscure the iris opening 112.

One of the challenges with using a mass transfer technique for various metasurface antennas is that the antenna has an array of unit cells, where each unit cell has an arbitrary rotation, in some embodiments. In the diode manufacturing, however, creating wafers with thousands of diodes with arbitrary rotation can be challenging and expensive. An alternative way is to use diodes with uniform orientation on the wafer and let the pick and place or mass transfer technique to rotate the diodes as they get transferred. However, also this technique can be very challenging, slow and expensive.

FIG. 4 is a top view of a half-round disk unit cell that enables the diode rotation to be uniform in orientation throughout an array, while the remainder of each of the unit cells, including the iris defined by the iris metal, is able to have a different rotation. For example, as shown in FIG. 4, in multiple placements of the unit cell with different rotations, the diodes 404 are all oriented in parallel to each other, i.e., with a shared constant zero degrees diode rotation (or some other constant amount of rotation in further embodiments). In one embodiment, the iris opening 402 and electrodes 406, all of which are formed with iris metal, are at constant orientation relative to each other in the unit cell, and the unit cell is rotated for the various placements in an array for the antenna (or a component of the antenna). For example, the iris metal defines an opening called the iris opening 402 and defines the electrodes 406, with metal material removed from a circular, or round, portion of a metal layer of the electrodes 406 as shown in FIG. 4, in each placement or instance of the unit cell.

More specifically, the unit cell design of FIG. 4 does not require a rotation of the diodes 404 on the wafer or during the transfer process. In one embodiment, this unit cell incorporates two electrodes 406 that have the shape of half round discs with a gap between them. Using this cell design allows to keep the orientation of the diode 404 unchanged while changing the rotation of the unit cell. In any arbitrary rotation of the cell the diode is bridging between the two half round discs, electrodes 406, and a rotation of the diode 404 is not necessary. The different rotations might result in a change of the resonance frequency which can be compensated through customized iris length, i.e., the length of the iris opening 402, for each of multiple unit cells to be placed throughout an array. The uniform orientation of the diodes 404 on wafers simplifies the mass transfer and alignment of diodes 404 to unit cells in an array of unit cells to enable all the diodes 404 to be placed during fabrication, particularly if using a rectilinear array placement techniques, with the same orientation even though the iris openings (and thus the antenna elements) are at different rotations.

Figure 5A:
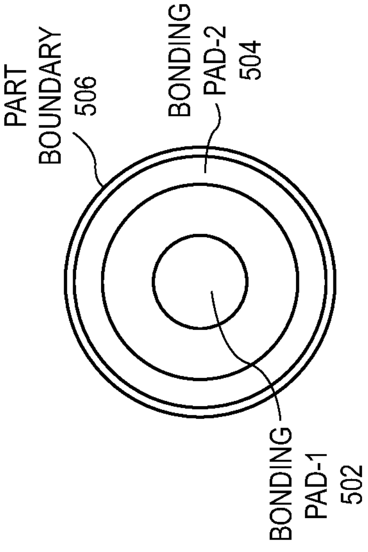
FIG. 5A is a bottom view of a circular diode.
Figure 5B:
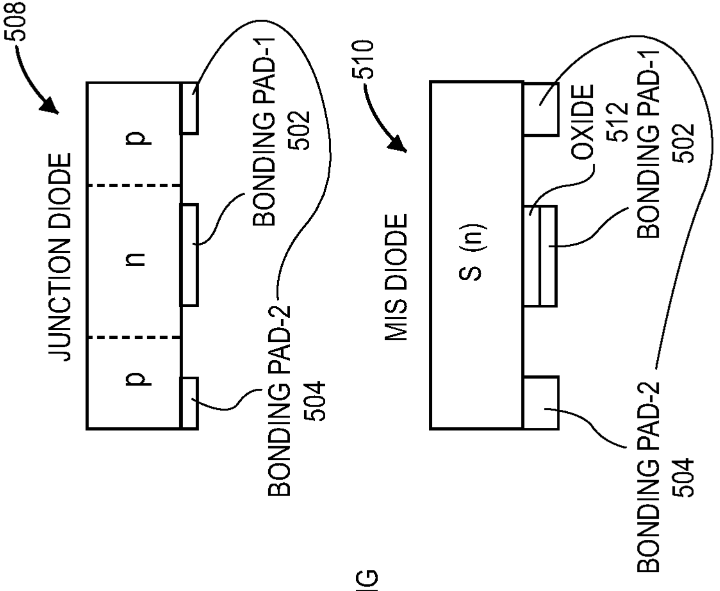
FIG. 5B is a cross section view of an unpackaged circular diode.
Figure 5C:
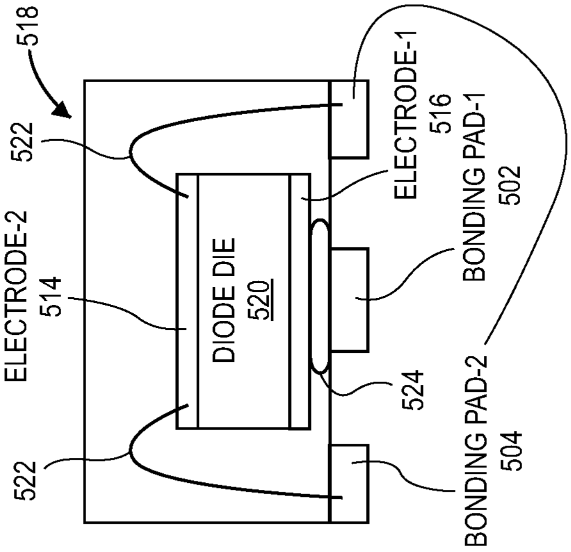
FIG. 5C is a cross section view of a circular diode package.

In another embodiment, circular discrete parts (e.g., diodes) shown in FIGS. 5A, 5B and 5C can be used. This is a rotationally symmetric part with electrode pads that are also rotationally symmetric. Such a circular part can be fabricated either as a circular diode without a package (see FIG. 5B) or a conventional rectangular diode die packaged in a circular package (see FIG. 5C).

FIG. 5A is a bottom view of a circular diode. This circular part has rotationally symmetric bonding pads. One terminal of the diode is available for connection at a bonding pad at the center of the circular part, circular bonding pad-1 502. The other terminal of the diode is available for connection at a bonding pad at a ring of the circular part, ring-shaped bonding pad-2 504.

In alternative embodiments, the circular diode has a junction diode or a metal-insulator-semiconductor (MIS) diode structure. This could be accomplished by tailoring the doping profiles and/or insulator/electrode locations. FIG. 5B is a cross section view of an unpackaged circular diode. There are two circular diode embodiments, a junction diode 508 and an MIS (metal insulator semiconductor) diode 510, where each is a die without a package. In the junction diode 508, the circular n terminal in the center is connected to a bonding pad-1 502, and the ring-shaped outer p terminal surrounding the circular n terminal is connected to a ring-shaped bonding pad-2 504. In the MIS diode 510, the center terminal has an oxide 512 and bonding pad-1 502, and the outer terminal is connected to bonding pad-2 504. In one embodiment, the oxide 512 in an MIS diode 510 is sufficiently thin that quantum mechanical tunneling takes place across the insulator from the metal to the semiconductor.

Other types of diode structures can also be tailored to build a circular diode without a package.

In another method, a circular diode part can be built using a circular package and a conventional diode die. Conventional die can be attached to the circular package with a solder paste aligned to the central bonding pad (bonding pad-1) and wire bonding from the other electrode to the outer bonding pad. FIG. 5C is a cross section view of a circular diode package. This circular part has circular package pads. The packaged diode 518 has a diode die 520, which is rectangular in this embodiment, inside a package. One or more bonding wires 522 connect the electrode-2 514 of the diode die 520 to the ring-shaped bonding pad-2 504 of the package, for one terminal of the diode die 520. Solder 524 or other electrical connection material connects the electrode-1 516 of the diode die 520 to the central circular bonding pad-1 502 of the package, for the other terminal of the diode die 520.

Figure 6:
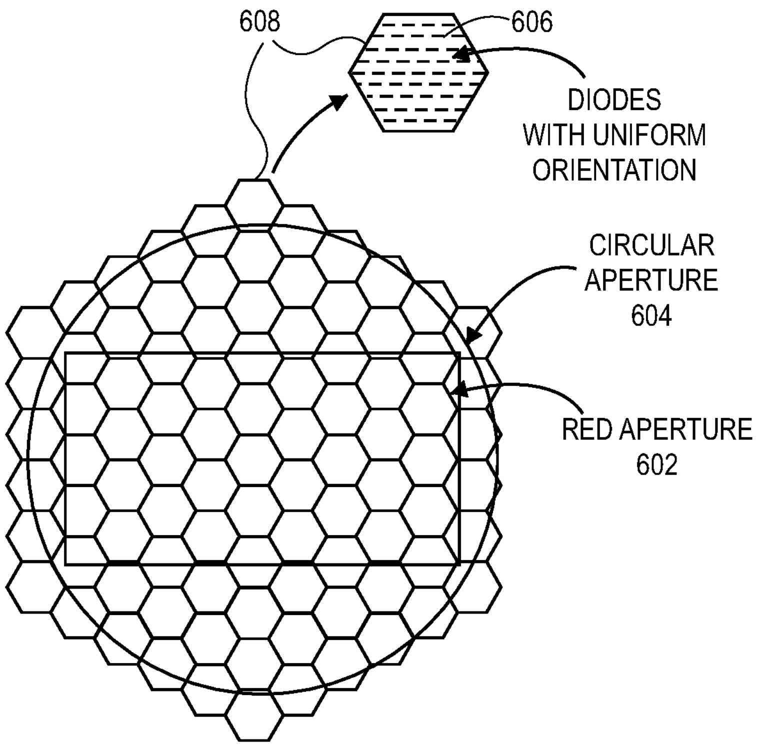
FIG. 6 is a top view of a population of a large circular or rectangular aperture with diodes that have a uniform orientation within hexagonal sub-arrays.
Figure 7:
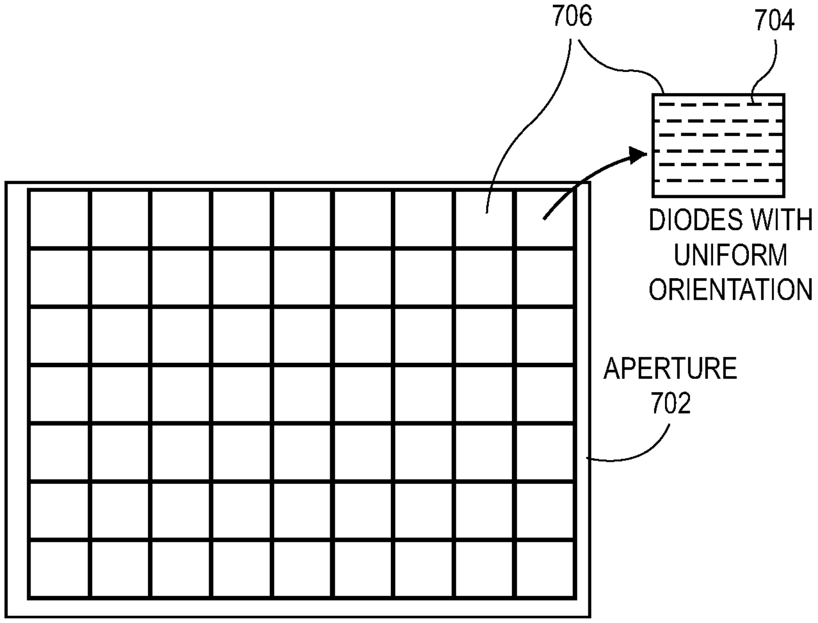
FIG. 7 is a top view of a population of a large rectangular aperture with diodes that have a uniform orientation within rectangular shaped sub-arrays.

In one embodiment, the metasurface has unit cells that do not have uniform diode orientation. For example, the orientation of the unit cells varies with their location on the metasurface. This has a huge impact on the cost of diodes and their transfer. To implement this concept, in one embodiment the placement of the unit cells has to be on a rectangular grid while the rotation can be arbitrary. With the proposed rotation agnostic unit cell design and uniform diode orientation, an entire antenna surface (aperture) may be constructed via mass transfer techniques using dies as reticles to populate a large surface. In this case, the antenna aperture is fabricated from small wafers that are all the same reprints. FIGS. 6 and 7 illustrate two embodiments in which a larger antenna surface in the form of a circle or rectangle, respectively, is populated with diodes from semiconductor wafers, where the wafers are reprints of the same wafer design. Note that placement of antenna elements on rings or spirals is generally inefficient, but may be done in further embodiments.

In most mass transfer technologies the size of the tooling head (or stamp) that transfers the diodes from the wafer to the target substrate is relatively small compared to the size of the target substrate, e.g., the antenna aperture. FIG. 6 is a top view of a population of a large circular antenna aperture 604 with a hexagonal transfer tool or stamp that has a smaller size. During each transfer step one hexagonal area will be populated on the target substrate. The hexagonal tool or hexagonally shaped tooling head can pick up and place each of an array of diodes 606 that have a uniform orientation, onto a semiconductor wafer die 608. The shape of the transfer tooling head, in this example hexagonal, is independent of the shape of the wafer and independent of the shape of the aperture 602, 604. The array of hexagons in FIG. 6 is a pattern of possible diode transfers mapped on the possible rectangular and circular (or other shaped) apertures. Thus, the circular aperture 604 has an array of iris openings, each of which is tunable through the respective diode 606 of the respective unit cell. The large aperture could be other shapes in further embodiments. One embodiment has a rectangular aperture 602 that is created using a number of hexagonal transfer tool(s). In various embodiments, a single transfer tool could be used to transfer each diode 606 or a pair of diodes 606 (or other tunable capacitance devices) for placement, e.g., in a serial pick and place operation, or multiple transfer tools could be used for transfers in parallel.

FIG. 7 is a top view of a population of a large rectangular antenna aperture 702 that comprises a rectangular shaped transfer tool (stamp). The rectangular shaped transfer tool can populate a small rectangular area 704 with each transfer step. The diodes on the wafer 704 and on the target substrate 706 can have a uniform orientation. The large aperture could be other shapes in further embodiments.

Furthermore, the segmentation of an illustrated antenna aperture can be used to simplify the rotation of diodes and reduce issues with their placement. In one embodiment, instead of covering a range of 0 to 180 degrees of rotation, the unit cells only have to cover a range 0 to 90 degrees of rotation and the segmentation does the rest through the rotation of segments. That can simplify the proposed rotation agnostic unit cell design.

Figure 8A:
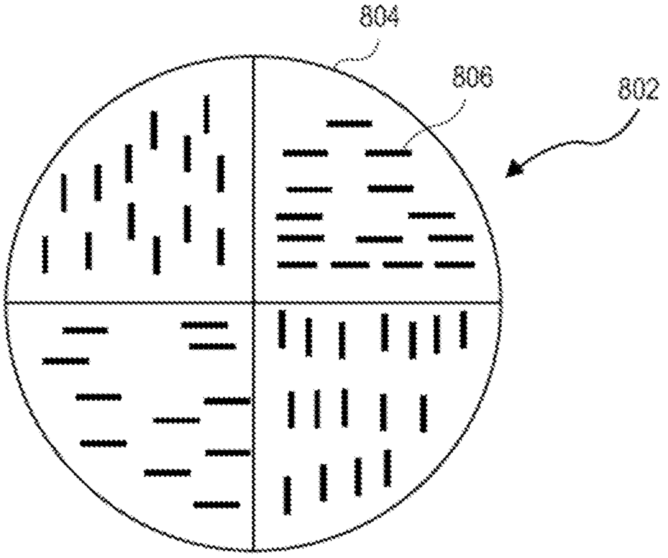
FIG. 8A illustrates how the use of segmentation can simplify the rotation of cells and diode placement.

FIG. 8A illustrates the use of segmentation to simplify the rotation of cells and diode placement. In this embodiment, a circular antenna aperture 802 has four segments 804, each occupying a quarter of a circle (or quadrant of a disk). In one embodiment, the four segments 804 are not physically separate segments; however, in other embodiments, they may be. Each segment 804 has diodes 806 aligned in parallel across the segment 804, with each diode 806 in a unit cell. The four segments 804 are placed at 0 degrees, 90 degrees, 180 degrees, and 270 degrees of rotation in the circular aperture 802. By doing so, the rotation of the unit cell does not need to cover a range of 0 to 180 degrees but only 0 to 90 degrees.

Figure 8B:
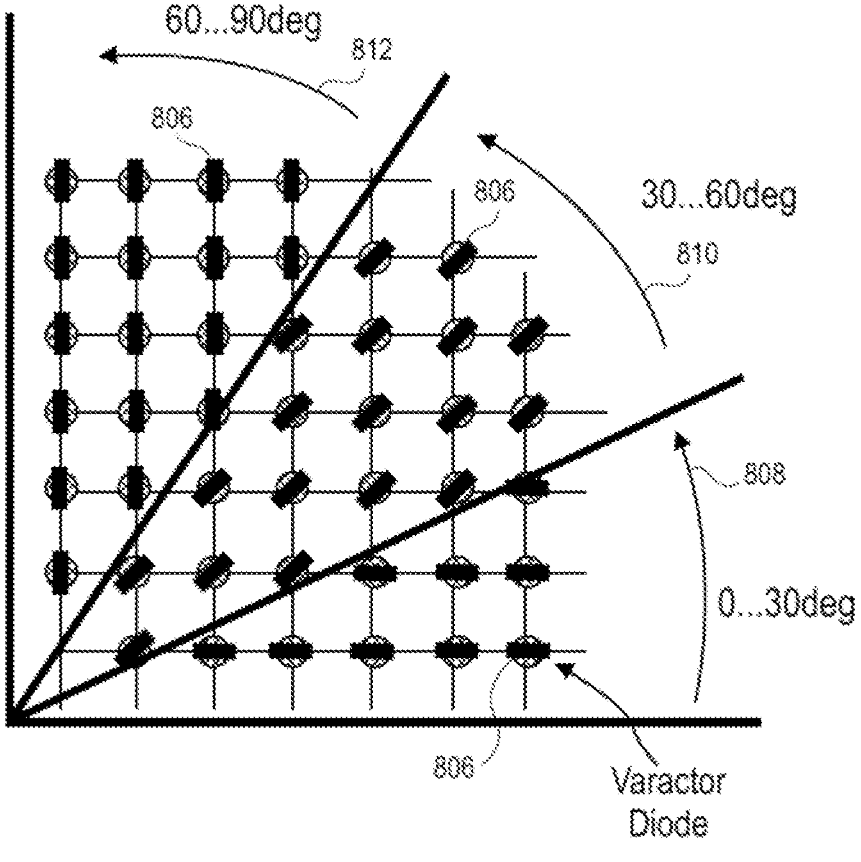
FIG. 8B depicts a variation of the design in FIG. 8A, with the orientation of the diodes discretized into three sections.

The rotation of the diodes can be discretized further to simplify the design process. FIG. 8B shows a quadrant of the full circle from FIG. 8A in which the orientation of the diodes is further discretized into three sections. The orientation of the diodes in each of the labeled 30-degree sections is uniform while the orientation changes from one area to the next one. With this concept, instead of covering 90 degrees of cell rotation the design only needs to cover 30 degrees. Other angular discretization can be implemented, too.

Figure 8C:
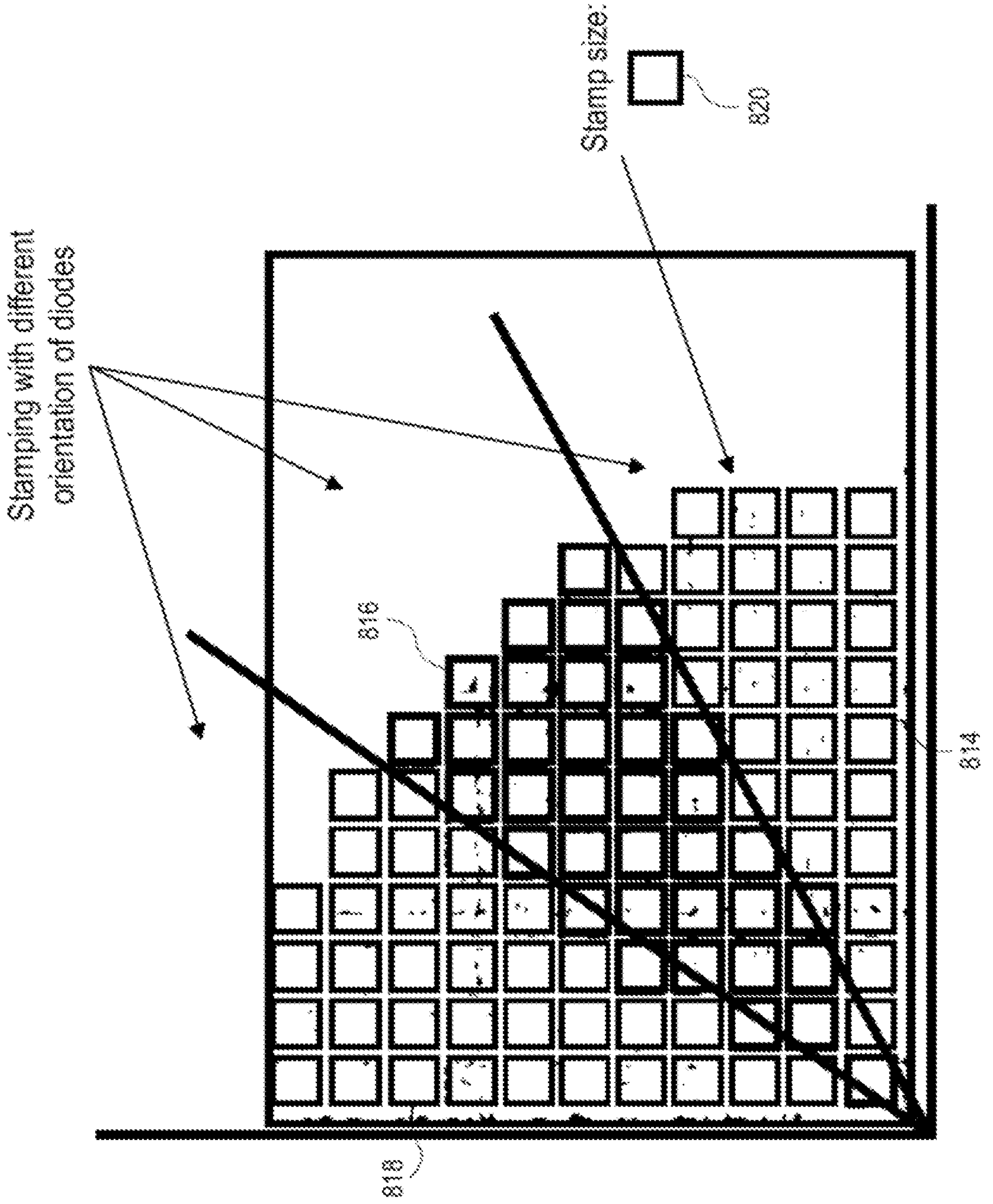
FIG. 8C illustrates how the design from FIG. 8B can be populated using small and rectangular stamps.

FIG. 8C shows how the design from FIG. 8B can be populated using small and rectangular stamps. In each of the 30-degree sections, the orientation of the diode is uniform which allows a fast transfer of diodes in fabrication. Along the boundaries of two neighboring sections the orientation of the diodes can be one way or the other.

Bias Circuitry

Figure 9A:
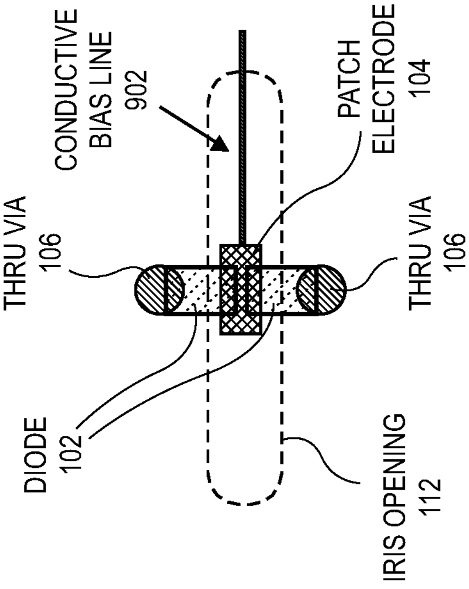
FIG. 9A illustrates a unit cell with two symmetrically placed diodes with a resistive bias electrode connected directly to a patch electrode.
Figure 9B:
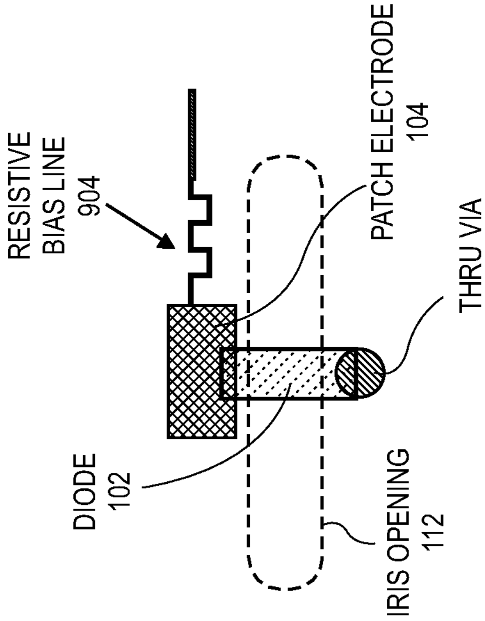
FIG. 9B illustrates a unit cell with a single diode and a resistive bias line connected directly to the patch electrode, using a resistive bias line.

In order to tune the varactor diode, a tuning voltage needs to be applied between the two sides of the diode. The embodiments shown in FIGS. 1A, 1B, 2, 3A, 3B and 3C include examples of the bias traces that could be used. In one embodiment, the bias electrode is routed and/or located so that it does not interfere or couple with the RF signals generated by the antenna elements. Because of that, the bias circuitry is a determining factor for the selection of the unit cell design concept. FIGS. 9A and 9B illustrate two different embodiments in which the bias electrode won't interfere with the RF signal. The embodiments differ in that the bias circuitry could use conductive or resistive bias lines.

FIG. 9A illustrates two symmetric diodes 102 with a conductive bias electrode 902 (also called a conductive bias line) connected directly to a patch electrode 104. Similar to the unit cell in FIGS. 2 and 3B, this unit cell has two diodes 102 that are end-to-end or back-to-back, spanning across and iris opening 112. In this design, each diode 102 has a respective thru via 106 connected to one terminal, and the two diodes 102 have a common terminal connected to the patch electrode 104 located in the center of the iris opening 112. The conductive bias line (electrode) 902 connects to the patch electrode 104 and extends along a centerline of the iris opening 112 to and past one end of the iris opening 112. That is, the conductive bias electrode 902 is connected directly to the patch electrode 104 traversing the center of iris opening 112 so that the diodes 102, thru vias 106 and iris opening 112 are symmetric about the conductive bias electrode 902. Due to the symmetry of the conductive bias line 902 and the location of the patch-bias line connection, the conductive bias line 902 cannot interfere with the RF signal.

One of the ways to decouple the bias line from the patch electrode while maintaining a DC connection is to use resistive bias lines and/or discrete resistors. FIG. 9B illustrates a single diode 102 with the conductive bias line connected directly to the patch electrode using a resistive bias line 904 (also called a resistive bias electrode). Similar to the unit cell in FIGS. 1B and 3C, this unit cell has one diode 102 spanning across and iris opening 112. Here, one terminal of the diode 102 is connected to a thru via 106, and the other terminal of the diode 102 is connected to a patch electrode 104. The resistive bias line 904 is connected to the patch electrode 104, where the connection is off to the side of the iris opening 112. The resistive bias line 904 has added resistance which, in one embodiment, is produced by the square shaped meandered line. Other shapes may be used to increase the overall length of the line and thus increase the resistance over that of a straight bias line. Connecting the conductive resistive bias line 904 directly without the added resistance would have a significant impact on the RF signal, and this is avoided with the added resistance. A variety of different materials could be used to create the resistive bias line, e.g., Indium-Tin-Oxide (ITO), chromium, titanium, indium gallium zinc oxide (IGZO), indium zinc oxide (IZO), and organic conductors, to name a few. Material and design choices for these bias lines would be made based on the resistances needed.

Integration and Topology

Figure 10:
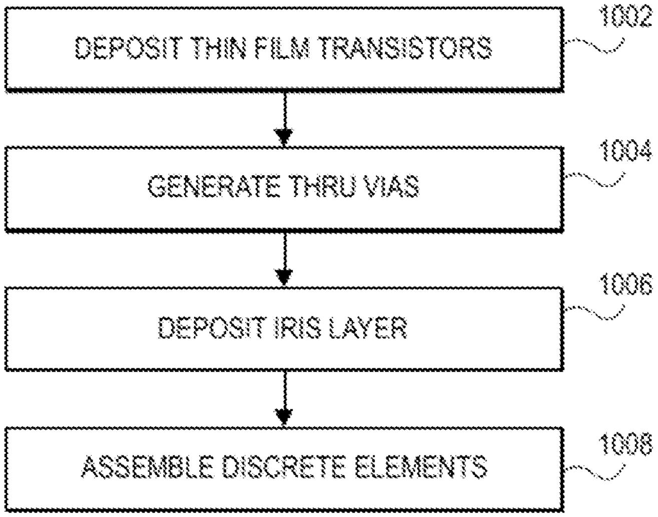
FIG. 10 is a flow diagram that illustrates a method of manufacturing, for an embodiment for a metasurface antenna.

The embodiments shown in FIGS. 1A, 1B, and 2 can be manufactured using double sided processing of a substrate. In one embodiment, layers needed for the driving circuit, in this case the thin film transistor (TFT) matrix, are deposited first on the top (or one) side of the substrate where the patch electrode resides. After that a thru via is created by etching and metal deposition steps to connect the two sides of the substrate electrically. Finally, the iris layer, i.e., a metal layer that is used for forming the iris openings, will be deposited and patterned on the opposite (or second) side of the substrate. Later, discrete elements, e.g., diodes, can be assembled and/or otherwise attached to the substrate to finish the fabrication. FIG. 10 illustrates an example of a flow diagram depicting one embodiment of such a method of manufacturing for an embodiment for a metasurface antenna.

Referring to FIG. 10, in an action 1002, thin film transistors are deposited. For example, the thin film transistors are deposited on a substrate, using various semiconductor processing steps and materials.

Next, in an action 1004, thru vias are generated. In one embodiment, various well-known semiconductor processing steps and materials are used to form openings for the vias, and metal is deposited in the openings to form the connections. That is, to avoid ambiguity, the term "via" may be used to set forth opening or the metallic connection through the opening.

In an action 1006, the iris layer is deposited. In one embodiment, various well-known semiconductor processing steps and materials are used, and the iris layer is formed by depositing a metal layer, and etching the metal layer to define iris openings and further geometries in various embodiments. For example, electrodes may be formed in the iris layer.

In an action 1008, discrete elements are assembled. For example, diodes are assembled to the substrate, with each diode positioned in a unit cell that has an iris opening.

In another method, all the patterning and the assembly can be performed on one side of the substrate. In this method, discrete tunable elements are assembled on the same side of the substrate where TFT matrix is patterned or the iris features of the RF element are fabricated on the same side of the substrate where TFT matrix resides. This method enables fabrication of the RF antenna on a single substrate without double-sided processing of the substrate and/or thru via connection. The method uses the metal layer needed for the iris metal patterning as an electrical connection between the discrete tunable elements and the TFT matrix. It will be called an "iris interconnect" in this disclosure. A top view of the connection and a cross-sectional view is shown in FIGS. 11 and 12.

Figure 11:
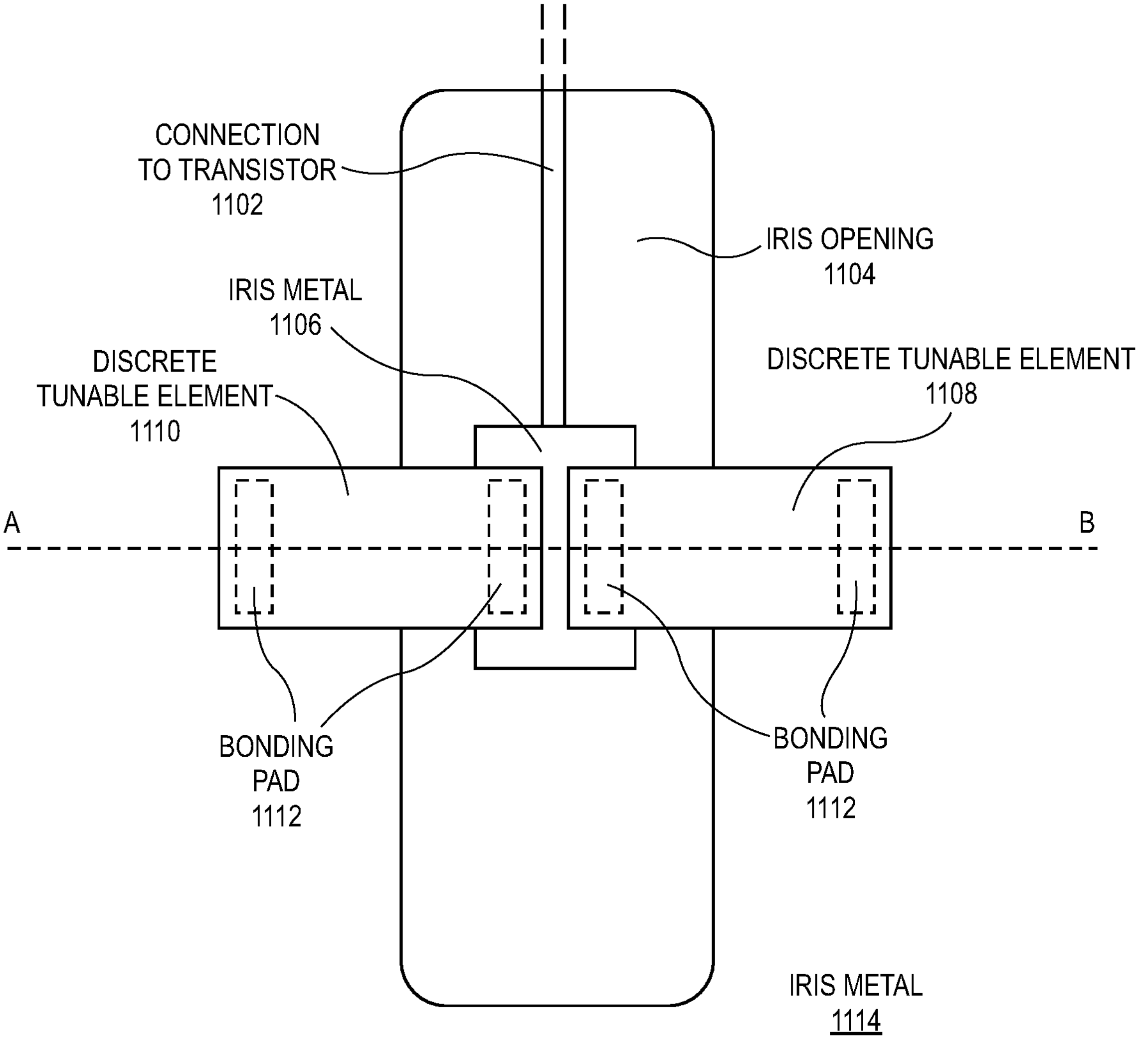
FIG. 11 is a top view of a diode integration with vias created using a thin film process

FIG. 11 is a top view of one embodiment of an antenna element that includes a diode-TFT array-iris connection. Such an antenna element may be part of a tunable slot antenna. This embodiment is substantially similar to the embodiment of FIG. 9A with all the elements on one side of a substrate (monolithic), as opposed to FIGS. 1A and 1B.

Referring to FIG. 11, iris metal 1114 is etched (i.e., removed in places) to form the iris opening 1104, with iris metal 1106 (e.g., a portion of the metal layer used for iris metal 1114) remaining in the center of the iris opening 1104, for example as a patch electrode 104 (see FIGS. 2 and 9A). Two discrete tunable elements 1108 and 1110 (e.g., varactors (e.g., varactor diodes), diodes 102) are located end-to-end or back-to-back across the iris opening 1104, each with one terminal and respective bonding pad 1112 connected to the iris metal 1106 (e.g., patch electrode 104), which is used to provide a tuning voltage for the antenna element. The remaining bonding pads 1112 of the discrete tunable elements 1110 are outside of the iris opening 1104 for connection to the iris metal 1114 (connection not shown). The iris metal 1106 has a connection 1102 to a transistor, for example conductive bias electrode 902 (also called conductive bias line, see FIG. 9A), that connects to a TFT or other transistor (not shown), which is circuitry for controlling the tunable elements 1108 and 1110.

Figure 12:
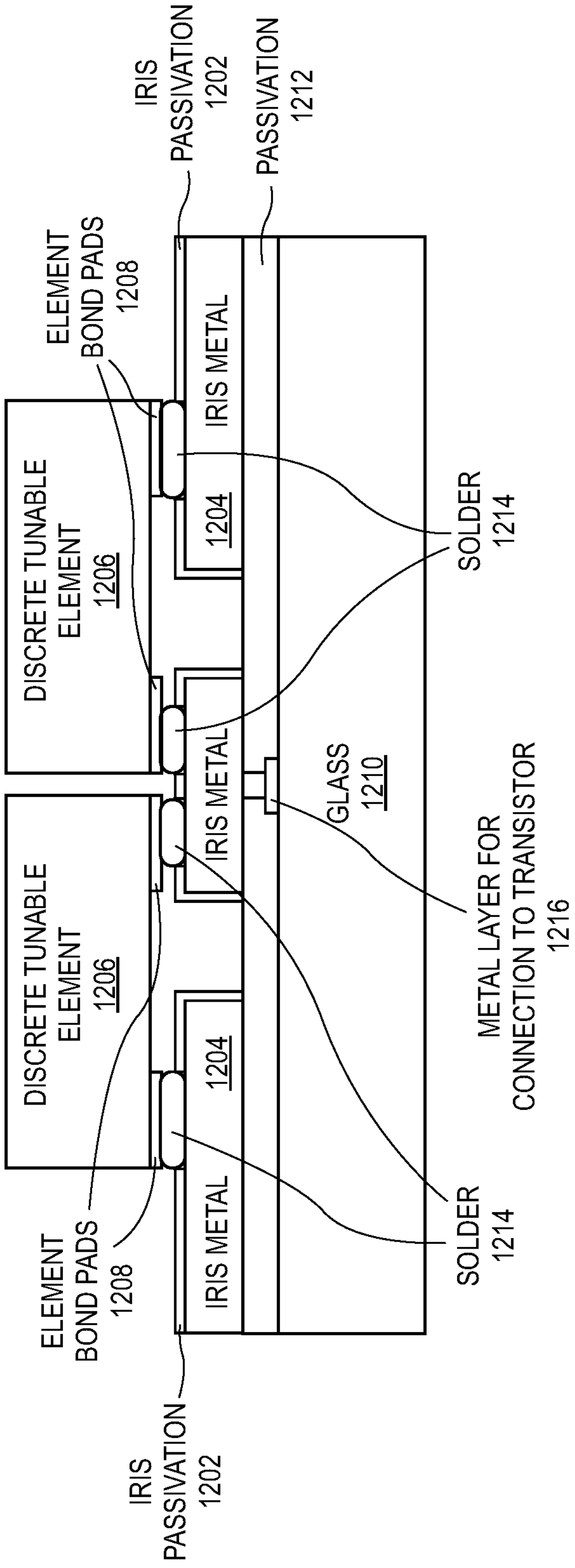
FIG. 12 is a cross section view of the diode integration of FIG. 11 along the A-B line.

FIG. 12 is a cross section view of the diode-TFT array-iris connection of FIG. 11 along the A-B line. In one embodiment, the fabrication starts with creating the TFT matrix on a glass substrate 1210. Illustratively, any one of a variety of TFT fabrication techniques may be utilized. Layers used for TFT matrix fabrication typically include multiple metal layers for electrical connection and multiple dielectric layers for passivation. For this method, TFT array fabrication ends with a passivation layer 1212 covering the TFT matrix. Openings that align to the iris interconnect area are created in this passivation layer 1212 where discrete tunable elements 1206 (see also discrete tunable elements 1108 and 1110 in FIG. 11) are later connected to the TFT matrix. Additionally, a metal trace 1216 aligning to the opening in the passivation layer 1212 and the iris interconnect is patterned to make the connection to the TFT matrix. One of the metal layers in TFT matrix fabrication (e.g., gate metal, source metal) can be used for this connection.

In one embodiment, an iris metal 1204 layer is a few micrometers thick and it is deposited on a glass substrate 1210 using sputtering, electroplating or e-beam evaporation for example, or other process that may be devised. This metal layer is later etched to create iris openings 112, 402 (see, for example, FIGS. 1A-4, 9A and 9B) where all the metal in the iris opening area is removed. Illustratively, the iris metal is deposited on a glass substrate 1210 which already has a TFT matrix patterned on it. Additionally, a portion of the iris metal layer, generally referred to as the iris interconnect, is kept for electrical connection between the discrete tunable elements 1206 and the TFT matrix. The iris metal 1204 and the iris interconnect is protected by an iris passivation layer 1202, which is a dielectric layer (e.g., SiNx).

Still further, openings are created in the iris passivation layer for connecting the discrete tunable elements 1206 through respective element bond pads 1208 to the iris metal 1204 and the iris interconnect. This connection to the bonding or bond pads 1208 of the discrete tunable element(s) 1206 can be made using a solder 1214. Alternatively, such connections between bonding pads of the tunable elements and iris metal in this and other disclosed embodiments may be made with conductive paste, conductive polymer, conductive epoxy, silver epoxy, etc. in place of solder. Discrete parts can be assembled to this substrate using various methods, such as, but not limited to, pick-and-place, self-assembly, etc.

Discrete tunable elements 1108, 1110, and 1206 are shown in a rectangular shape in FIGS. 11 and 12. One skilled in the art will appreciate, however, the aspects of the present application are not limited to rectangular discrete elements. They might have different shapes such as, for example, a circle, triangle, etc. Bonding pads on the discrete tunable elements 1108, 1110, and 1206 can also reside on different faces. For example, a bonding pad may reside on the top surface and another bonding pad may reside on the bottom surface. Bonding pads may cover part of the surface or the whole surface. In this case, first electrical connection is made with a conductive paste or solder like the method described above and the second electrical connection is achieved by deposition of an additional metal layer to connect the top electrode to the iris.

Scalability

Discrete tunable capacitors are used as parts to be assembled in a metamaterial antenna. These could be varactor diodes, various semiconductor diodes (PIN diodes, MOSFET, BJT, HEMT, etc.) or MEMS structures. In one embodiment, the assembly site, or the final location of parts, is a glass substrate 1210 (e.g., as shown in FIG. 12) which is already patterned for a TFT driving matrix to apply the desired voltage on the assembled parts for controlling the antenna element (e.g., turning off (e.g., disabling) and on (e.g., enabling), fully or partially, the antenna element). Other substrates could be used in further embodiments.

In accordance with aspects of the present application, in one embodiment a self-assembly process is directed to assembly of components to a designed location at a predetermined orientation. Self-assembly processes can include but are not limited to using an assembly template (stencil) with designed gaps matching to the shape of the part, designing hydrophobic and hydrophilic areas on the part and the assembly site in addition to using steam or air-water interface to control the assembly location and orientation with surface tension, and designing parts to be magnetizable and controlling the assembly location and orientation with a magnetic field. Methods mentioned above can be used by themselves or in combination to assemble discrete tunable elements onto designed locations on a glass substrate in a unique orientation, for various embodiments. In some embodiments of an assembly method, the discrete tunable elements are in a liquid, gas or vacuum environment, and agitation is applied before or during application of magnetic field in a self-assembly process.

Figure 13:
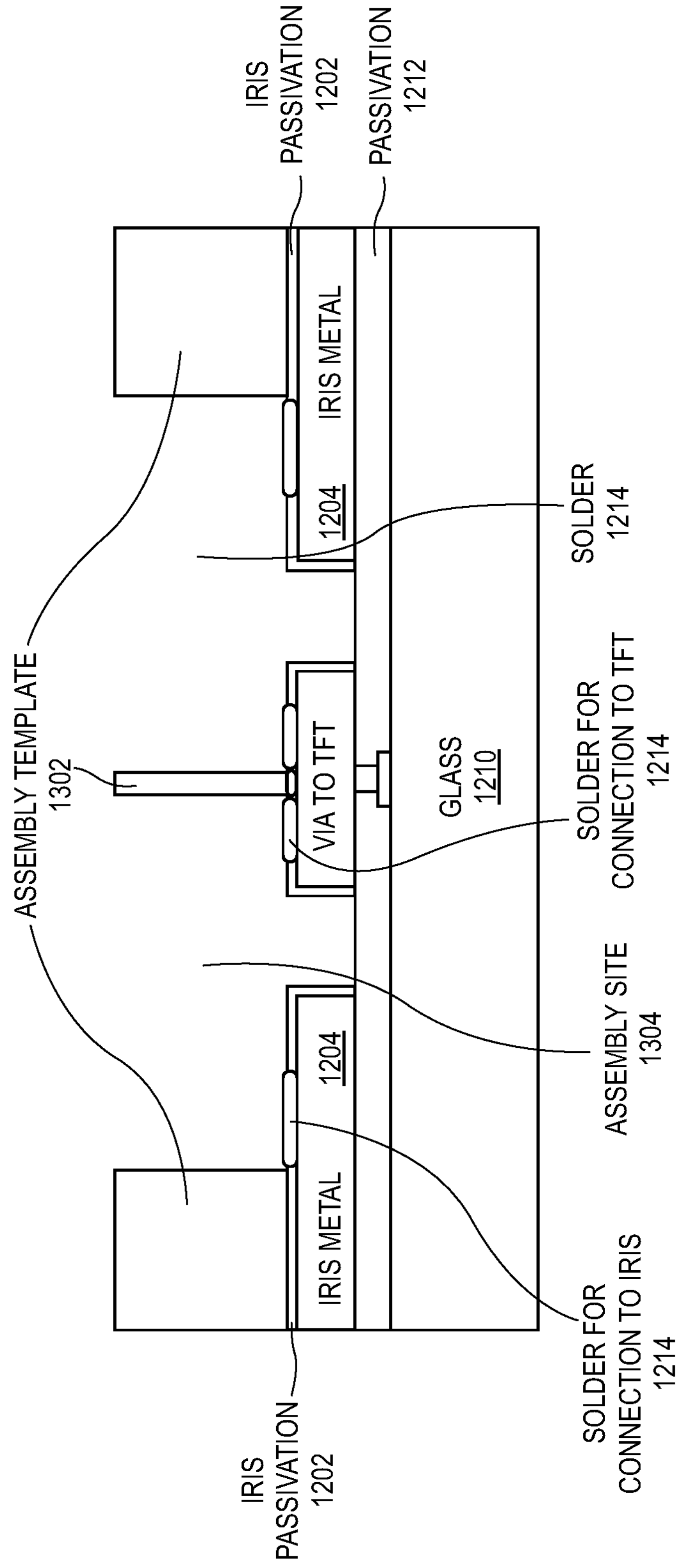
FIG. 13 is a cross section view of an assembly site with an assembly template.

FIG. 13 is a cross section view of an assembly site with an assembly template 1302. In accordance with an illustrative embodiment, one assembly method can combine shape matching and the use of a magnetic field during the assembly process. In one such method, an assembly template 1302 is used to immobilize the parts while they are being placed onto desired assembly locations, called assembly sites 1304. Thus, the assembly template 1302 is an intermediate object with designed gaps aligned to the assembly sites 1304 before parts, e.g., discrete tunable elements 1206, are dispersed for the self-assembly process. In one embodiment, openings in the assembly template 1302 are designed to match the shape of the part, e.g., discrete tunable element 1206, with some tolerance (see FIGS. 12, 13 and 14). In one example, rectangular parts (see discrete tunable element 1502 in FIG. 15A and discrete tunable element 1506 in FIG. 15B) are used and placed on the assembly sites 1304. However, other shapes can also be employed. This rectangular part has multiple symmetry axes and it can assemble to the site in four different orientations, in some embodiments. This symmetry is removed by depositing a ferromagnetic material (e.g., Ni or other similar metals/materials), on one of the bonding pads of the part, in some embodiments. Magnets are placed underneath the assembly sites to attract one or more of the discrete tunable elements, or a part thereof (e.g., one end of an element) to the assembly site at a unique orientation. In this case, the magnetic force is employed to achieve those orientations.

Note in one embodiment, the assembly template 1302 remains after assembly and does not impact the RF operation of the antenna (see FIGS. 13-16). In one embodiment, iris metal can form both the iris opening and the assembly template 1302 (see FIGS. 17 and 18), both of which remain after assembly. Alternatively, all or part of the assembly template 1302 is removed after placement of discrete tunable elements. For example, the assembly template 1302 is formed as a removable structure (see FIGS. 13-16, where the assembly template 1302 could be removed by processing after FIG. 16).

Figure 14:
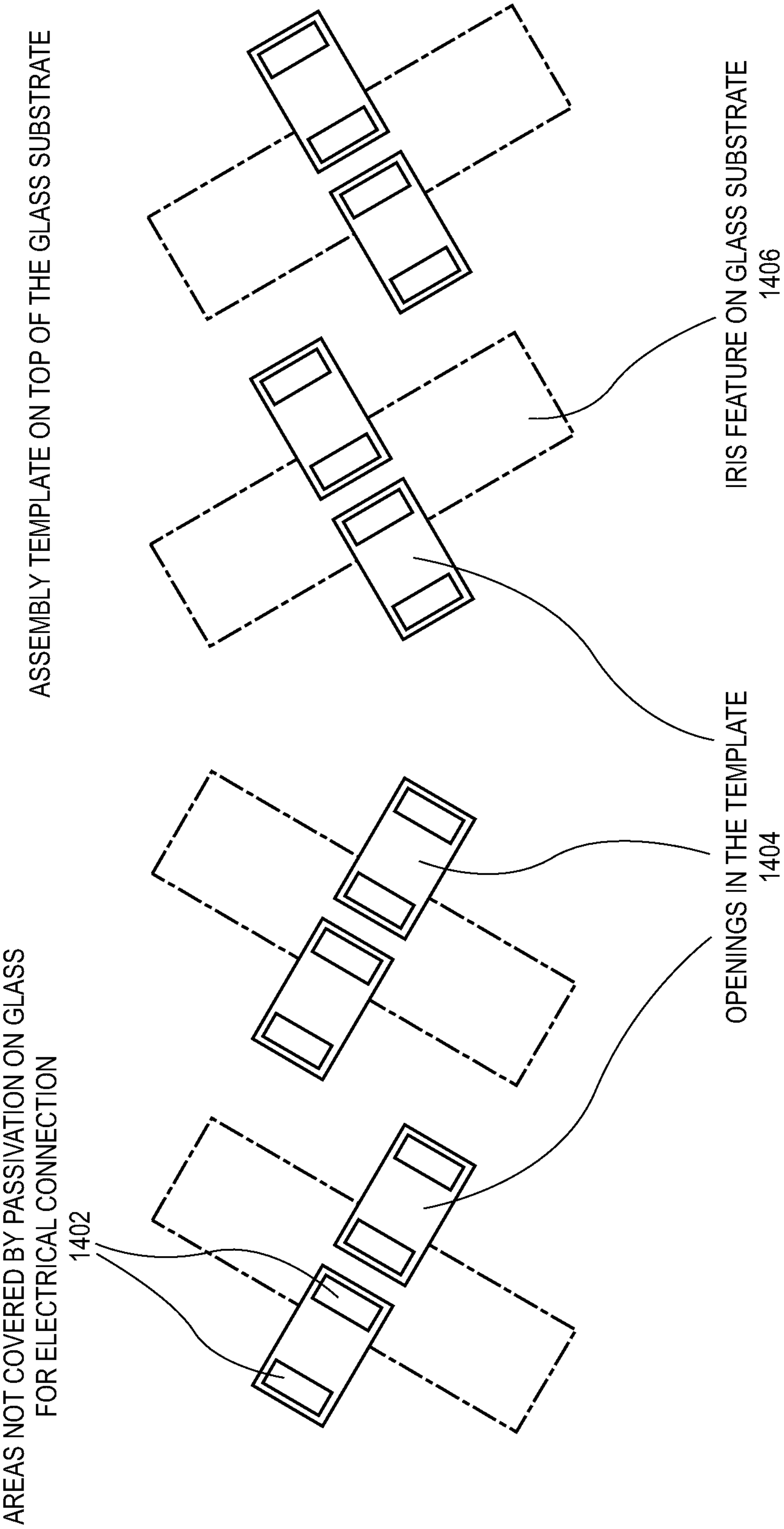
FIG. 14 is a top view of an assembly template on a glass substrate before assembly.

FIG. 14 is a top view of an assembly template 1302 on a glass substrate 1210 (see FIG. 13) before assembly. The assembly template 1302 is aligned to the glass substrate 1210, for example by various techniques in device processing, so that the assembly template 1302 is aligned with the iris feature 1406 on the glass substrate 1210. Openings 1404 in the assembly template 1302 align with the iris feature 1406, and also align with areas 1402 that are not covered by iris passivation layer 1202 on the glass substrate 1210 (see FIG. 13), for purposes of electrical connection to the discrete tunable elements. In FIG. 13, such areas 1402 are filled with solder 1214, and the discrete tunable element will align with the openings 1404 (see FIG. 14) in the assembly template 1302 and make a solder connection (see FIGS. 13 and 16).

Figure 15A:
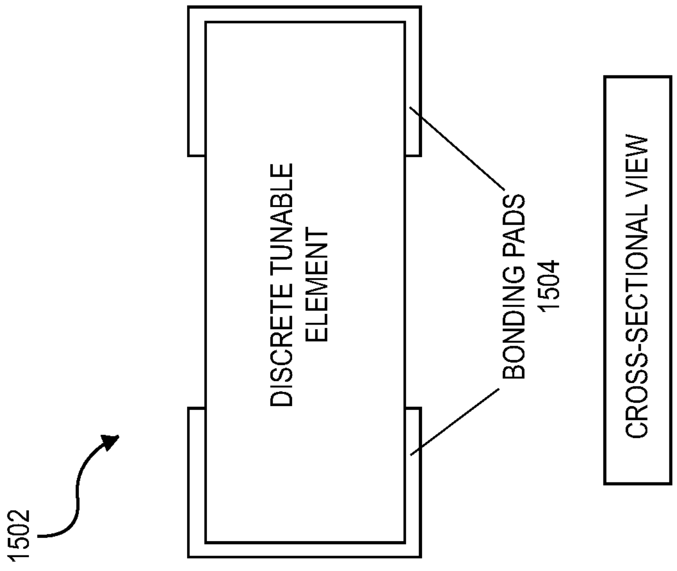
FIG. 15A is a cross section view of a part to be assembled, for one embodiment of a self-assembly process.

FIG. 15A is a cross section view of a part to be assembled, for one embodiment of a self-assembly process. Here, a discrete tunable element 1502 has ferromagnetic bonding pads 1504 wrapped around three surfaces at opposed ends of a rectangular part, e.g., a varactor or diode. Magnetic force is used, in one embodiment of a self-assembly process, to attract the ferromagnetic bonding pads 1504 and thus the discrete tunable element 1502 into place. Each bonding pad 1504 covers an end face and portions of two sides at that end of the part, or an end face and portions of four sides as a cap at that end of the part, in various embodiments.

Instead of or in addition to magnetic force, one can also use shape matching in a self-assembly process. In shape-matching, parts are designed with non-symmetric shapes and assembly templates are designed with non-symmetric openings such that parts can fit into the assembly site in a unique orientation. In another embodiment, the assembly process uses hydrophilic and/or hydrophobic surfaces to determine assembly locations. Generally, a combination of those methods can be used in various embodiments. For example, hydrophilic and/or hydrophobic surfaces are used for determining the assembly location and magnetic force to determine the part orientation. Agitation could be applied in various versions of a self-assembly process. Agitation serves as a disassembly force which will remove parts which are at an assembly site but in a wrong orientation.

Figure 15B:
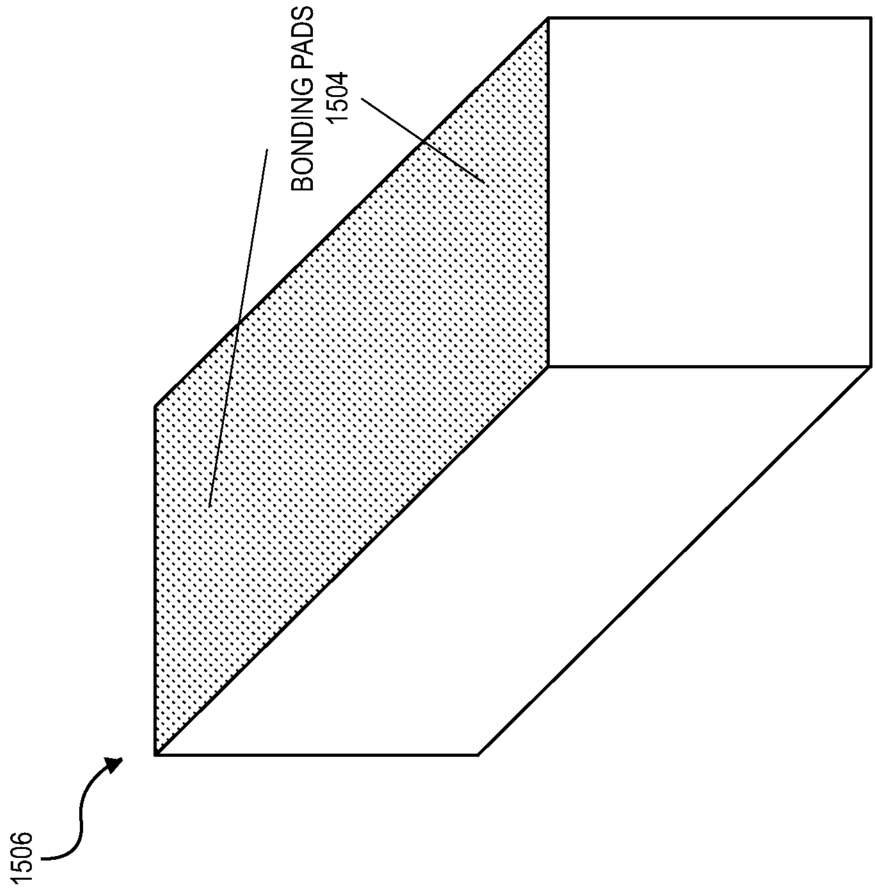
FIG. 15B is a perspective view of a part to be assembled, for a further embodiment of a self-assembly process.

FIG. 15B is a perspective view of a part to be assembled, for a further embodiment of a self-assembly process. In this embodiment, a discrete tunable element 1506 has ferromagnetic bonding pads 1504 on one surface, at opposed ends of a rectangular part, e.g., a varactor or diode.

Figure 16:
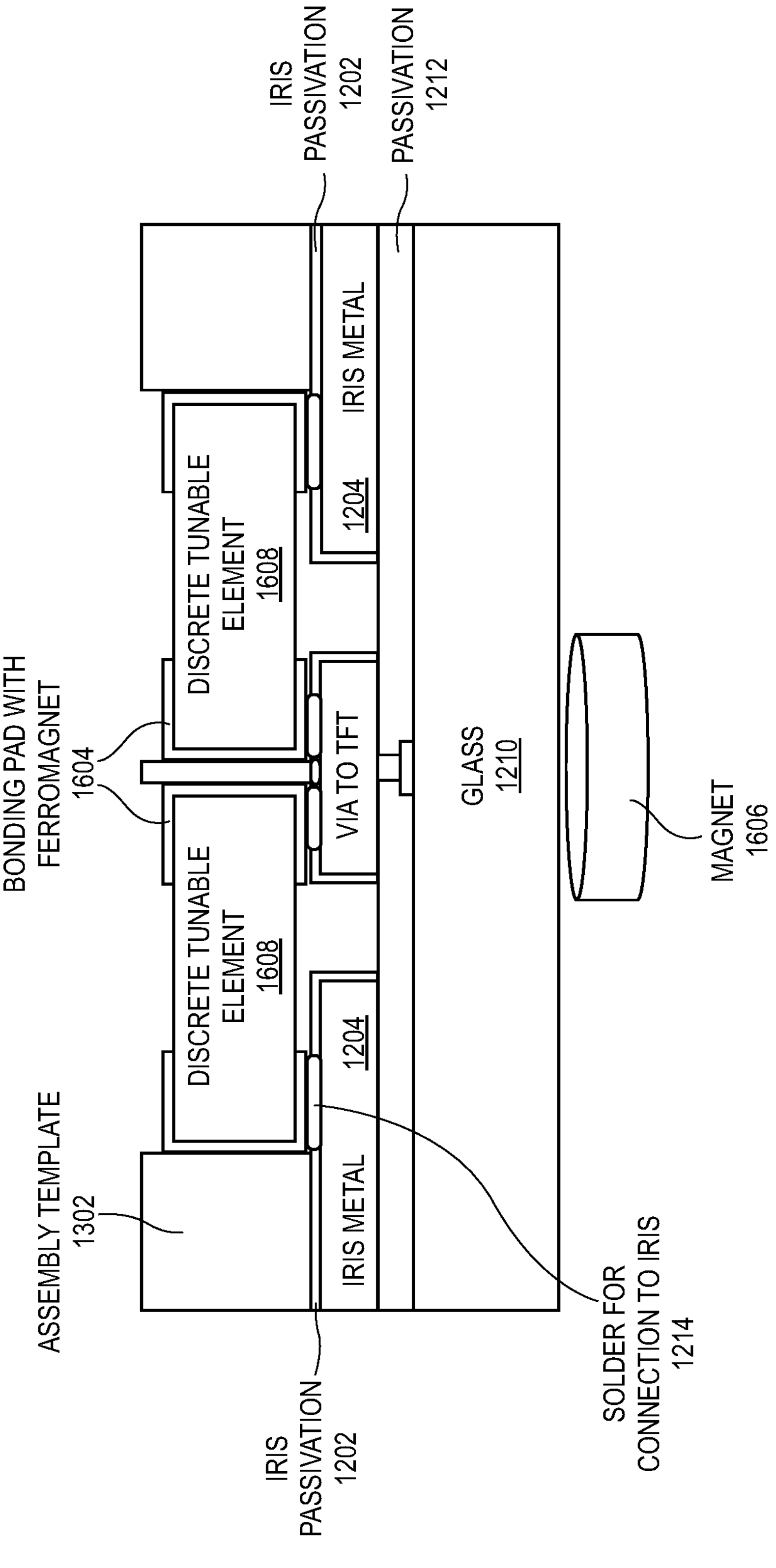
FIG. 16 depicts parts assembled in a desired orientation using ferromagnetic pads and a magnet.

FIG. 16 depicts parts assembled in a desired orientation using ferromagnetic pads and a magnet 1606. The magnet 1606 could be an electromagnet or a permanent magnet, or more than one of these, in various combinations and arrangements in various embodiments. The magnet 1606 attracts the ferromagnetic bonding pads 1604 of the discrete tunable elements 1608 in the self-assembly process, and the discrete tunable elements 1608 move into place in the openings in the assembly template 1302, aligning with the solder 1214, for connection to the iris metal 1204. A suitable heating process may be applied to melt the solder 1214 and form the electrical connection with the discrete tunable elements 1608.

The assembly template 1302 is placed on top of the glass substrate 1210 before the assembly starts. The assembly template 1302 is aligned with alignment marks such that each gap in the template aligns to an assembly site 1304 (see FIG. 13). Magnets 1606 are placed underneath each iris opening as shown in FIG. 16 to create a magnetic field that applies a force onto the ferromagnetic parts (see FIGS. 15A and 15B) are used in this example. After that, parts are dispersed on the template and vibration is applied into the system. Vibration amplitude, frequency and direction can be tailored to achieve the most efficient assembly. It was also shown in the literature that vibration direction can be changed during the assembly to prevent aggregation of parts. A camera-based feedback loop can be used for tailoring vibration parameters. Vibration will be removed from the system when a targeted assembly amount is achieved. To accelerate the assembly, more parts than the assembly sites can be dispersed in the first stage.

After the parts are transported to the assembly sites with the correct orientation, magnets 1606 are removed. The glass substrate 1210 and the assembly template 1302 are heated to reflow the solder 1214 and make electrical connections between the discrete tunable elements 1608 and the appropriate metal on the glass substrate 1210. In this example solder 1214 is pre-patterned on the glass substrate before the assembly. In another method, the solder 1214 can be pre-patterned on the parts before the assembly. Other conductive materials such as (thermo-responsive or UV-responsive solder pastes, nanoparticles, ACF bonds etc.) can also be used instead of the solder for electrical connection. Once the electrical connection is made, the assembly template 1302 can be removed, and the substrate is ready for the next step in the manufacturing process.

Figure 17:
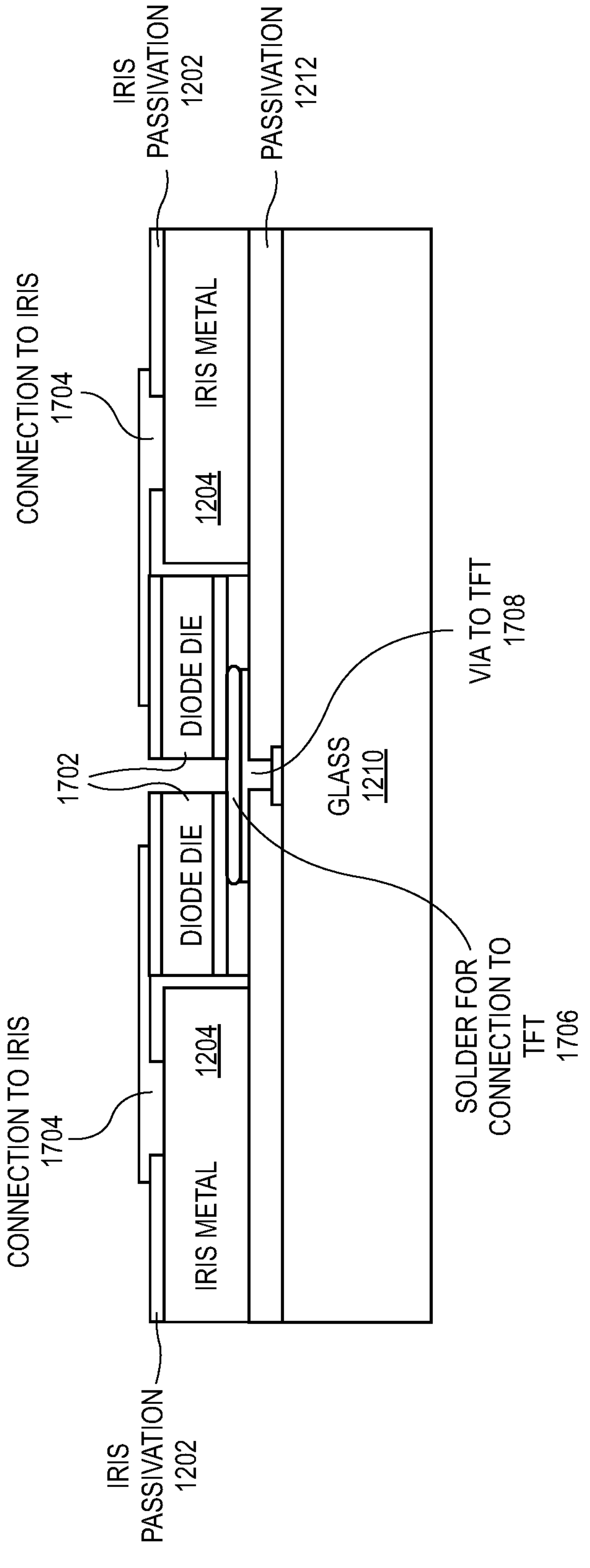
FIG. 17 depicts parts, including double-sided diode dies, assembled using the iris opening as a part of the assembly template.
Figure 18:
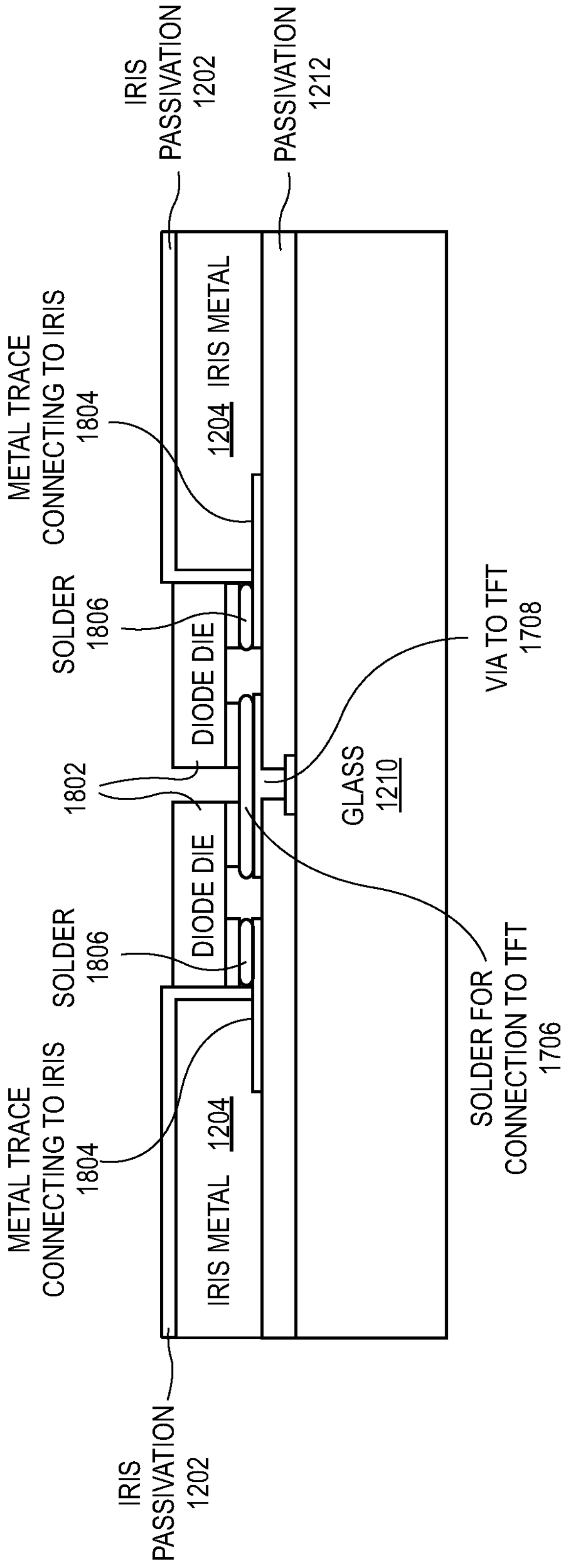
FIG. 18 depicts parts, including single-sided diode dies, assembled using the iris opening as part of the assembly template.

In a different method, openings in the iris metal can be used as a part of the assembly template. Thickness of the parts in this method are limited by iris metal thickness. Diode dies without a package should be used because of this limitation. Illustrations of assembled diode dies are shown in FIG. 17 and FIG. 18. In FIG. 17, a double-sided diode die 1702 which has electrodes on two sides is assembled into the iris slot and electrical connection to iris metal 1204 is made using a metal deposition and patterning step after the assembly. In FIG. 18, a single-sided diode die 1802 which has electrodes on the same side is assembled into the iris slot. A second connection is patterned in the iris opening area along with the via 1708 before iris metal deposition. That connection is used to connect the diode to iris metal 1204 after the diode assembly.

FIG. 17 depicts parts, including double-sided diode dies 1702, assembled using the iris opening as a part of the assembly template. One side and respective terminal of each of the double-sided diode dies 1702 is electrically connected with solder 1706 to the via 1708, for connection to the TFT matrix or other circuitry. The opposing side and respective terminal of each of the double-sided diode dies 1702 has a connection 1704 to the iris metal 1204, and the connection 1704 could be formed by a metal layer. Asymmetry differentiates the top and bottom of the diode die 1702. Note that in one embodiment the unit cell (slot) has the freedom to rotate with respect to a fixed diode orientation and still connect the diode and the iris metal 1204.

FIG. 18 depicts parts, including single-sided diode dies 1802, assembled using the iris opening as part of the assembly template. The two terminals on the one side of each of the single-sided diode dies 1802 are connected appropriately using solder. Here, the two adjacent terminals of the two adjacent single-sided diode dies 1802, i.e., one terminal from one diode, and an adjacent terminal from the other diode, are connected to each other and to a via 1708 with solder 1706. The two opposed terminals of the two single-sided diode dies 1802, i.e., the other terminal from the one diode, and the other terminal from the other diode, are connected to respective iris metal 1204, with solder 1806.

Examples of Antenna Embodiments

The techniques described above may be used with flat panel satellite antennas. Embodiments of such flat panel antennas are disclosed. The flat panel antennas include one or more arrays of antenna elements on an antenna aperture. In one embodiment, the antenna aperture is a metasurface antenna aperture, such as, for example, the antenna apertures described below. In one embodiment, the antenna elements comprise diodes and varactors such as described above. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system, or an antenna having a metasurface as described herein. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology (e.g., antenna elements) to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 19A:
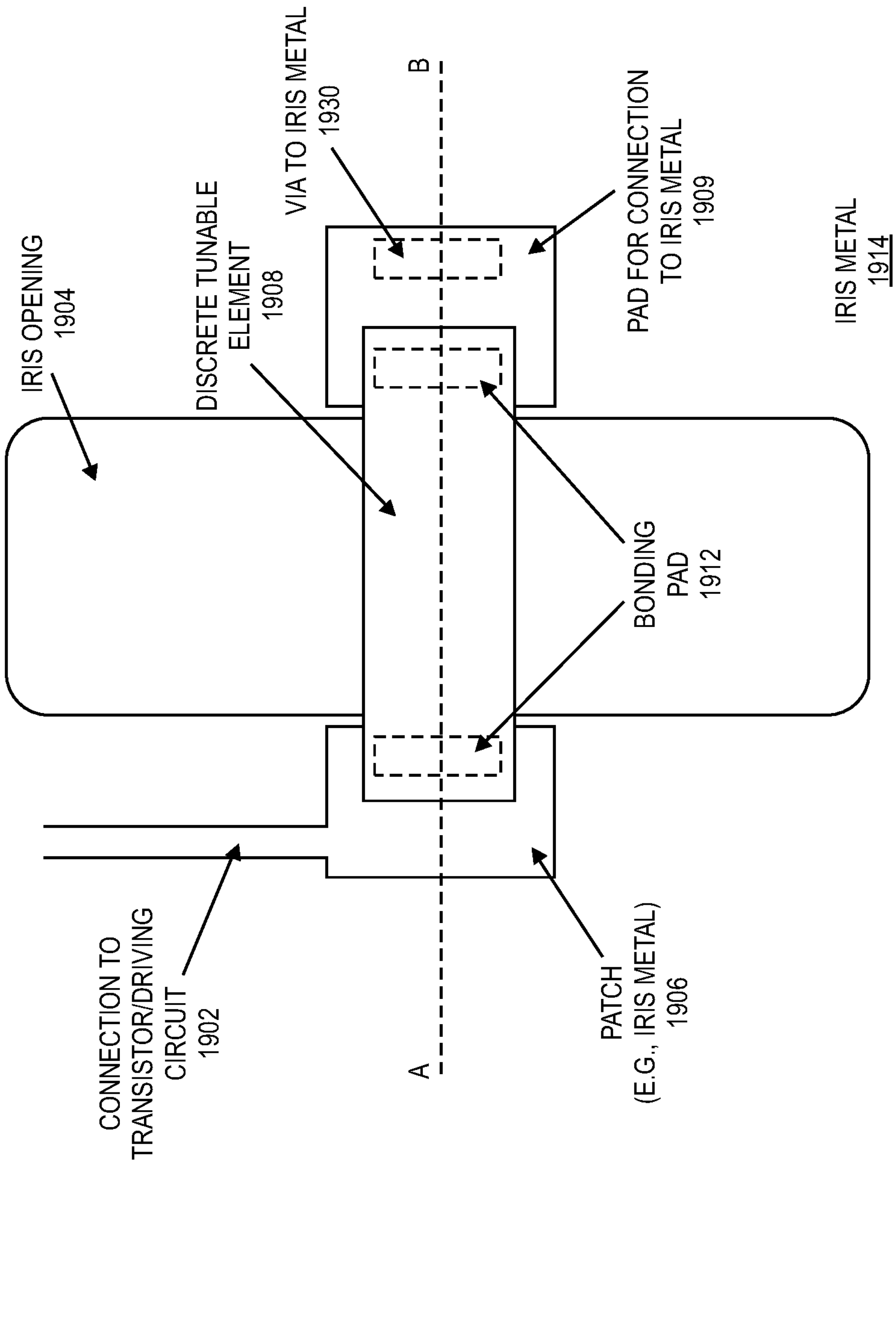
FIGS. 19A and 19B illustrate another embodiment of an antenna element that includes a diode-TFT array-iris connection.

FIG. 19A is a top view of another embodiment of an antenna element that includes a diode-TFT array-iris connection. Such an antenna element may be part of a tunable slot antenna. This embodiment is similar to the embodiments of FIGS. 9B and 11 in that all the elements are on one side of a substrate (monolithic), as opposed to the embodiments of FIGS. 1A and 1B.

Figure 19B:
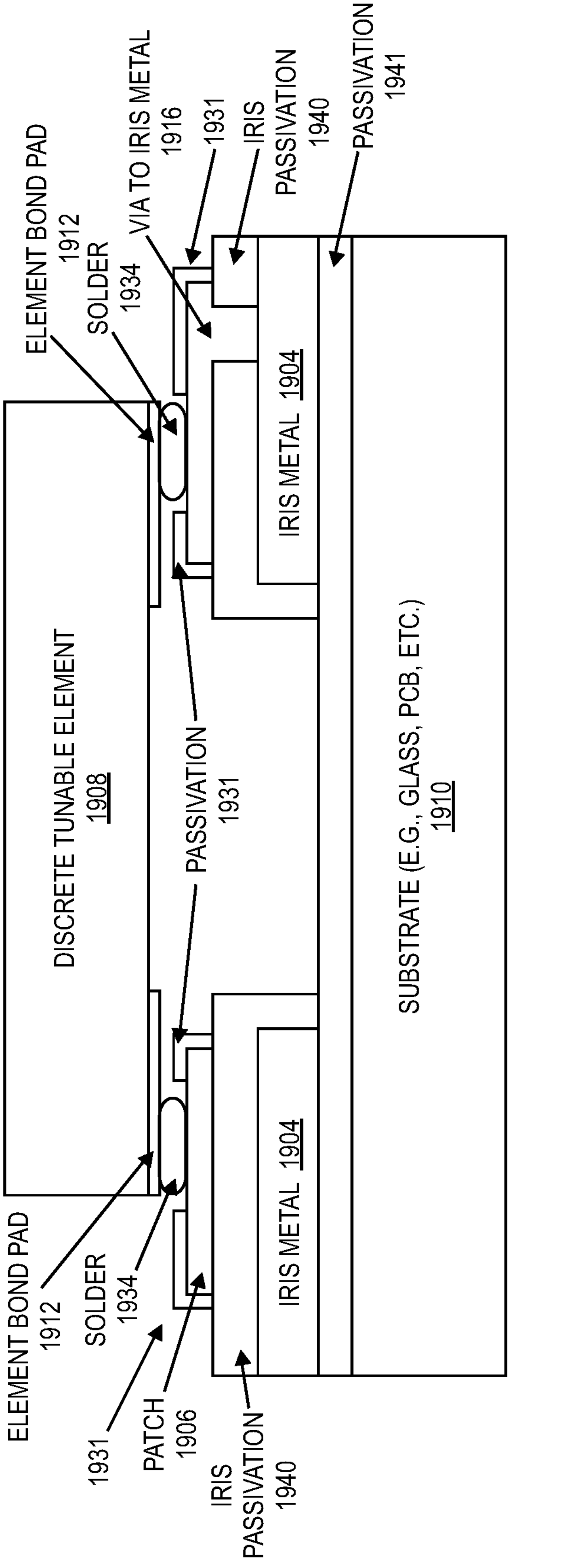

Referring to FIG. 19A, iris metal 1914 is etched (i.e., removed in places) to form the iris opening 1904. One discrete tunable element 1908 (e.g., varactors, varactor diodes, diodes 102) is located across the iris opening 1904, with one terminal and respective bonding pad 1912 connected to the patch 1906 (e.g., patch electrode 104), which is outside of iris opening 1904 and is used to provide a tuning voltage for the antenna element. In one embodiment, patch 1906 is formed on a metal layer separate from the iris metal layer. The remaining bonding pad 1912 of the discrete tunable element 1908 is outside of the iris opening 1904 for connection to the iris metal by way of the pad 1909. In one embodiment, the pad 1909 is formed on the same metal layer as patch 1906. Pad 1909 is connected at connection point 1930 to iris metal using a thru via 1916 (FIG. 19B). The iris metal has a connection 1902 to a transistor/driving circuit, for example conductive bias electrode 902 (also called conductive bias line, see FIG. 9A), that connects to a TFT or other transistor (not shown), which is circuitry for controlling the tunable element 1908.

FIG. 19B is a cross section view of the diode-TFT array-iris connection of FIG. 19A along the A-B line. In one embodiment, the fabrication of the antenna element of FIGS. 19A and 19B is performed in the same way as that of the antenna element in FIGS. 11 and 12 except where the designs differ. That is, the fabrication starts with creating the TFT matrix on a glass substrate 1910. Illustratively, any one of a variety of TFT fabrication techniques may be utilized. Layers used for TFT matrix fabrication typically include multiple metal layers for electrical connection and multiple dielectric layers for passivation. For this method, TFT array fabrication ends with a passivation layer 1941 covering the TFT matrix. Openings are created in that passivation layer 1941 which align to a via structure connecting TFT array to the patch 1906 and connection 1902 (see FIG. 19A). Connection 1902 and patch 1906 are formed on a metal layer separate from iris metal layer, it can be called the patch metal layer. An opening in the iris metal layer, separate from the iris opening, is created in the TFT array-to-patch metal via location. This via structure isn't shown in FIG. 19A and FIG. 19B. Metal traces connecting each TFT to a driver IC, i.e. Row traces and Column traces in a TFT matrix, can be fabricated either below the Iris metal using the metal layers for the TFT matrix or above the Iris metal using additional metal layers.

In one embodiment, an iris metal layer (i.e., a metal layer in which the iris opening 1904 is formed) is a few micrometers thick and it is deposited on a glass substrate 1910 using sputtering, electroplating or e-beam evaporation. This metal layer is later etched to create iris openings 112, 402, 1904 (see, for example, FIGS. 1A-4, 9A and 9B) where all the metal in the iris opening area is removed. Illustratively, the iris metal is deposited on a glass substrate 1910 which already has a TFT matrix patterned on it. The iris metal layer in which iris openings 1904 are formed is protected by an iris passivation layer 1931, which is a dielectric layer (e.g., SiNx). In a further embodiment, the TFT matrix (e.g., circuitry with thin film transistors) is deposited above the iris metal, for example on top of the iris passivation layer 1931.

Still further, openings are created in the iris passivation layer for connecting the pad on patch metal layer (e.g., pad 1909) to the iris metal. Additional openings including via 1916 are created in the passivation layer covering the patch metal layer (1931) to connect the patch 1906 and the pad 1909 to discrete tunable element 1908 through respective element bond pads 1912. This connection to the bonding or bond pads 1912 of the discrete tunable element 1908 can be made using a solder 1934. Alternative, such connections between bonding pads of the tunable elements and iris metal in this and other disclosed embodiments may be made with conductive paste, polymer, conductive epoxy, silver epoxy, etc. in place of solder. Discrete parts can be assembled to this substrate using various methods, such as, but not limited to, pick-and-place, self-assembly, etc.

Discrete tunable element 1908 is shown in a rectangular shape in FIGS. 19A and 19B. One skilled in the art will appreciate, however, the aspects of the present application are not limited to rectangular discrete elements. They might have different shapes such as, for example, a circle, triangle, etc. Bonding pads on the discrete tunable element 1908 can also reside on different faces. For example, a bonding pad may reside on the top surface and another bonding pad may reside on the bottom surface. Bonding pads may cover part of the surface or the whole surface. In this case, first electrical connection is made with a conductive paste or solder like the method described above and the second electrical connection is achieved by deposition of an additional metal layer to connect the top electrode to the iris.

Figure 20B:
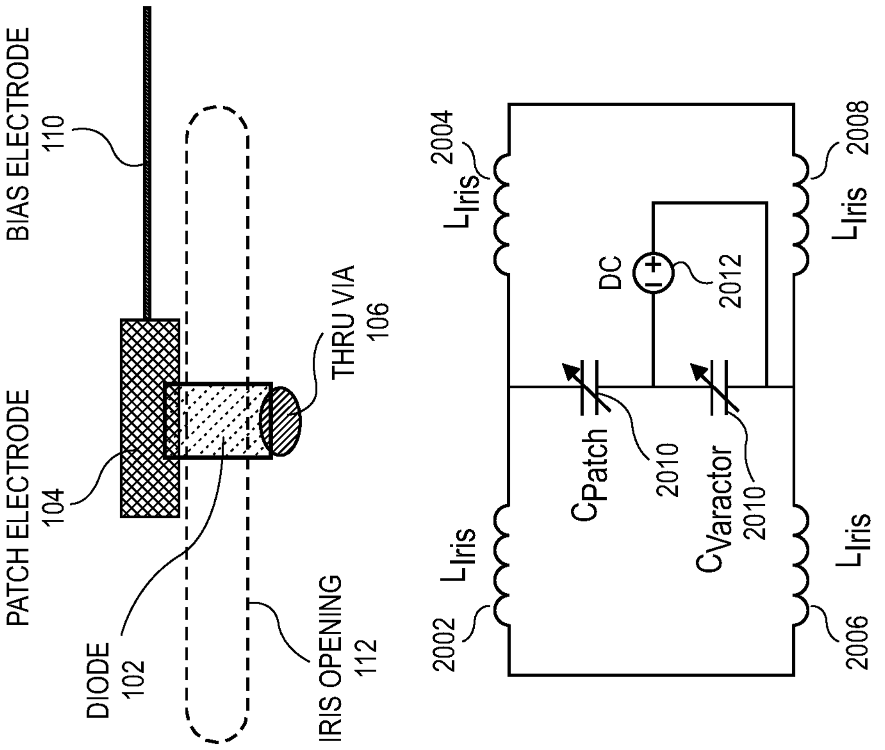
FIGS. 20A and 20B illustrate embodiments of a circuit schematic depicting electronic circuit equivalences or representations of tunable iris opening unit cells for metasurface or metamaterial antennas.
Figure 20A:
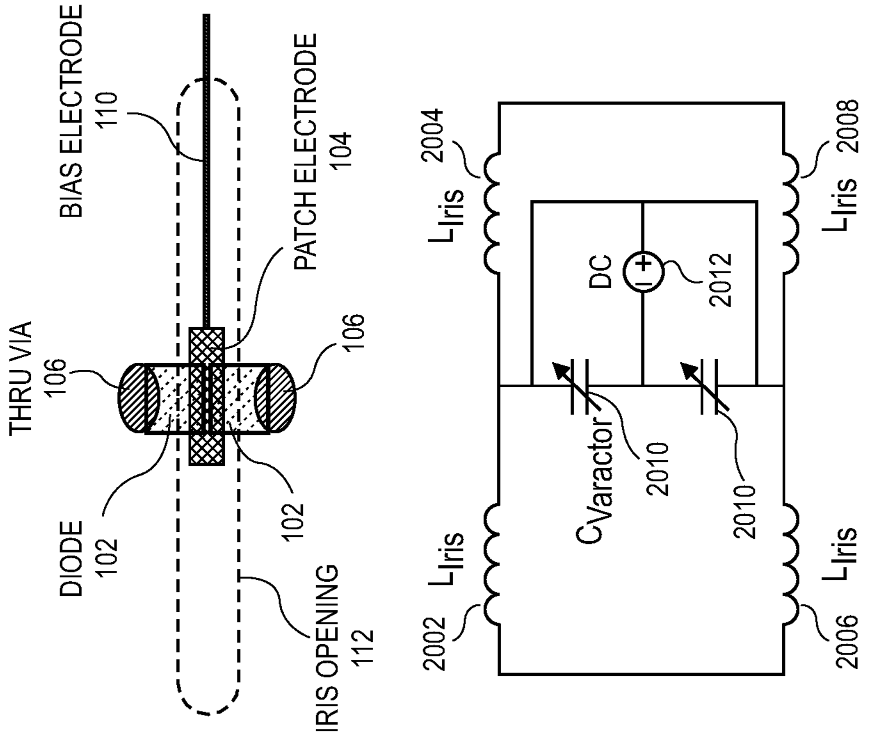

FIGS. 20A and 20B illustrate electronic circuit equivalences or representations of tunable iris opening unit cells for metasurface or metamaterial antennas. FIG. 20A is a circuit representing the iris opening 112 and diodes 102 in the embodiment depicted in FIGS. 2 and 9A. Inductance of the iris opening 112 is represented by four inductors 2002, 2004, 2006, 2008 that are each labeled $L_{Iris}$. Two variable capacitors 2010, each being a varactor and labeled $C_{Varactor}$, represent the diodes 102 and are in series with each other. The series combination of variable capacitors 2010 is in parallel with two branches of inductors, with iris inductor 2002 being in series with iris inductor 2006 and iris inductor 2004 being in series with iris inductor 2008. Variable capacitance of the varactors, variable capacitors 2010, is controlled by a DC voltage source 2012, which can be time-varying to update the resonance state of the unit cells and control the properties of the metasurface or metamaterial for operation of the antenna.

FIG. 20B is a circuit representing the iris opening 112 and diode 102 in the embodiment depicted in FIGS. 1B and 9B. Inductance of the iris opening 112 is represented by four inductors 2002, 2004, 2006, 2008 that are each labeled $L_{Iris}$. One variable capacitor 210, a varactor labeled $C_{Varactor}$, represents the diode 102 and is in series with another capacitor, which represents the patch and is labeled $C_{Patch}$. The series combination of capacitor 2014 and variable capacitor 2010 is in parallel with two branches of inductors, iris inductor 2002 being in series with iris inductor 2006 and iris inductor 2004 being in series with iris inductor 2008. Variable capacitance of the varactor, variable capacitor 2010, is controlled by a DC voltage source 2012, which can be time-varying to update the resonance state of the unit cells and control the properties of the metasurface or metamaterial for operation of the antenna.

Figure 21:
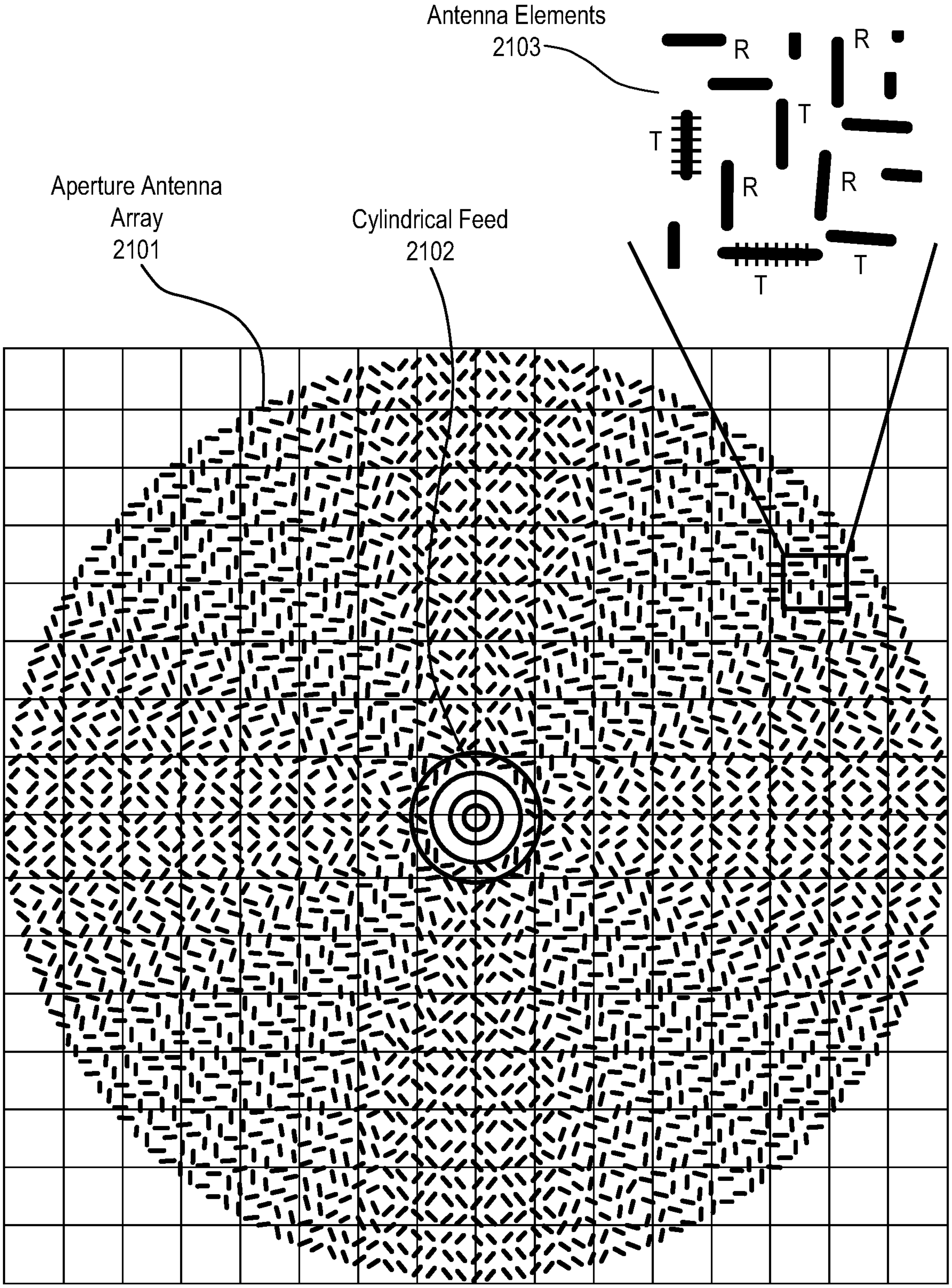
FIG. 21 illustrates the schematic of one embodiment of a cylindrically fed holographic radial aperture antenna.

FIG. 21 illustrates the schematic of one embodiment of a cylindrically fed holographic radial aperture antenna. Referring to FIG. 21, the antenna aperture has one or more arrays 2101 of antenna elements 2103 that are placed in concentric rings around an input feed 2102 of the cylindrically fed antenna. In one embodiment, antenna elements 2103 are radio frequency (RF) resonators that radiate RF energy. In one embodiment, antenna elements 2103 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 2102. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 2103 comprise irises (iris openings) and the aperture antenna of FIG. 21 is used to generate a main beam shaped by using excitation from a cylindrical feed wave for radiating the iris openings through tunable diodes and/or varactors. In one embodiment, the antenna can be excited to radiate a horizontally or vertically polarized electric field at desired scan angles.

In one embodiment, each scattering element in the antenna system is part of a unit cell as described above. In one embodiment, the unit cell is driven by the direct drive embodiments described above. In one embodiment, the diode/varactor in each unit cell has a lower conductor associated with a slot from an upper conductor associated with its patch electrode (e.g., iris metal). The diode/varactor can be controlled to adjust the bias voltage between the iris opening and the patch electrode. Using this property, in one embodiment, the diode/varactor integrates an on/off switch for the transmission of energy from the guided wave to the unit cell. When switched on, the unit emits an electromagnetic wave like an electrically small dipole antenna. Note that the teachings herein are not limited to having unit cell that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch electrode using a controller. Traces to each patch electrode are used to provide the voltage to the patch electrode. The voltage is used to tune or detune the capacitance and thus the resonance frequency of individual elements to effectuate beam forming. The voltage required is dependent on the diode/varactor being used.

In one embodiment, as discussed above, a matrix drive is used to apply voltage to the patch electrodes in order to drive each cell separately from all the other cells without having a separate connection for each cell (direct drive). Because of the high density of elements, the matrix drive is an efficient way to address each cell individually.

In one embodiment, the control structure for the antenna system has two main components: the antenna array controller, which includes drive electronics for the antenna system, is below the wave scattering structure of surface scattering antenna elements such as described herein, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space, and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 22:
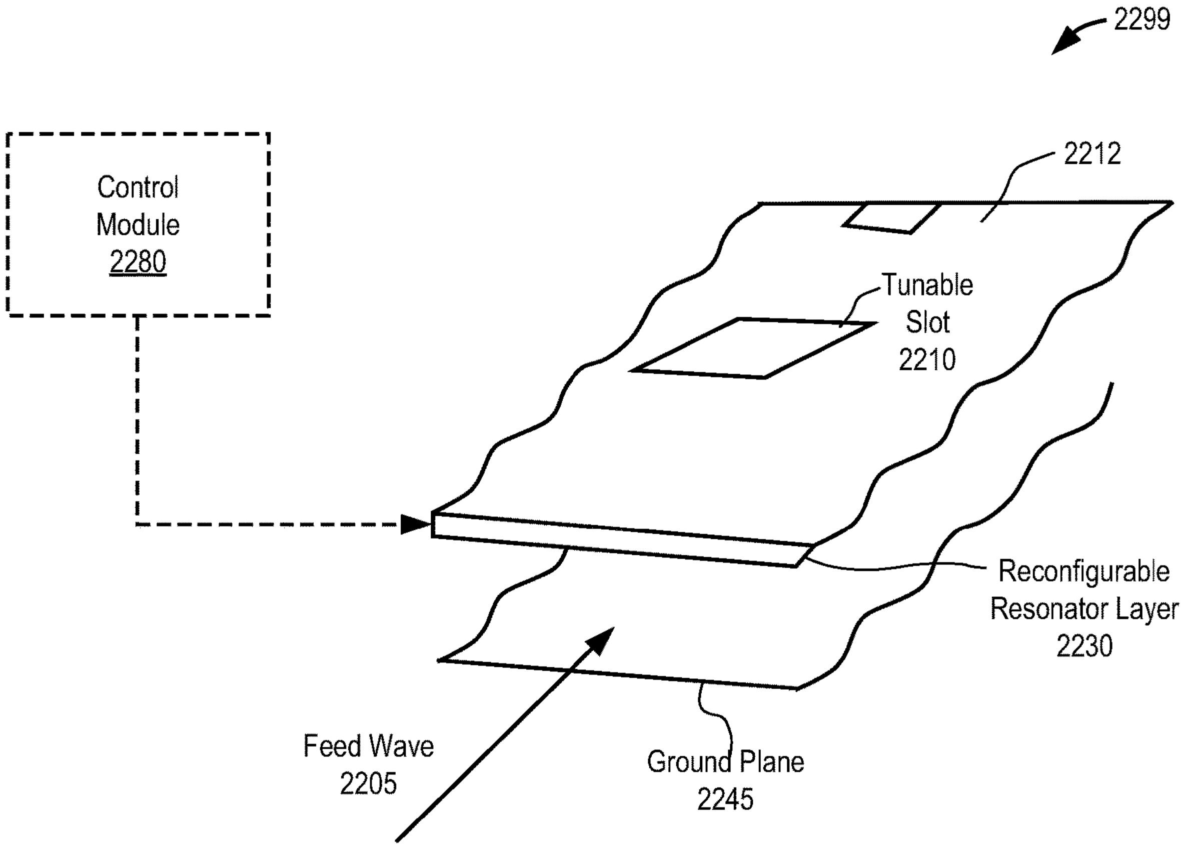
FIG. 22 illustrates a perspective view of one row of antenna elements that includes a ground plane and a reconfigurable resonator layer.

FIG. 22 illustrates a perspective view of one row of antenna elements that includes a ground plane 2245 and a reconfigurable resonator layer 2230. Reconfigurable resonator layer 2230 includes an array 2212 of tunable slots 2210. The array 2212 of tunable slots 2210 can be configured to point the antenna in a desired direction. Each of the tunable slots 2210 can be tuned/adjusted by varying a voltage, which changes the capacitance of the varactor diode and results in a frequency shift, which in turn changes the amplitude and phase of the radiating antenna element. A proper phase and amplitude adjustment of the antenna elements in an array will result in a beam formation and beam steering.

Control module 2280, or a controller, is coupled to reconfigurable resonator layer 2230 to modulate the array 2212 of tunable slots 2210 by varying the voltage to the diodes/varactors. Control module 2280 may include a Field Programmable Gate Array ("FPGA"), a microprocessor, a controller, System-on-a-Chip (SoC), or other processing logic. In one embodiment, control module 2280 includes logic circuitry (e.g., multiplexer) to drive the array 2212 of tunable slots 2210. In one embodiment, control module 2280 receives data that includes specifications for a holographic diffraction pattern to be driven onto the array 2212 of tunable slots 2210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 2280 may drive each array of tunable slots described in various embodiments in the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 2205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 2210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

A voltage between the patch electrode and the iris opening can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy radiated from feed wave 2205 propagating through the waveguide. As an example, if feed wave 2205 is 20 GHz, the resonant frequency of a slot 2210 may be adjusted (by varying the capacitance) to 17 GHz so that the slot 2210 couples substantially no energy from feed wave 2205. Or, the resonant frequency of a slot 2210 may be adjusted to 20 GHz so that the slot 2210 couples energy from feed wave 2205 and radiates that energy into free space. Although the examples given are binary (fully radiating or not radiating at all), full gray scale control of the reactance, and therefore the resonant frequency of slot 2210 is possible with voltage variance over a multi-valued range. Hence, the energy radiated from each slot 2210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Figure 23:
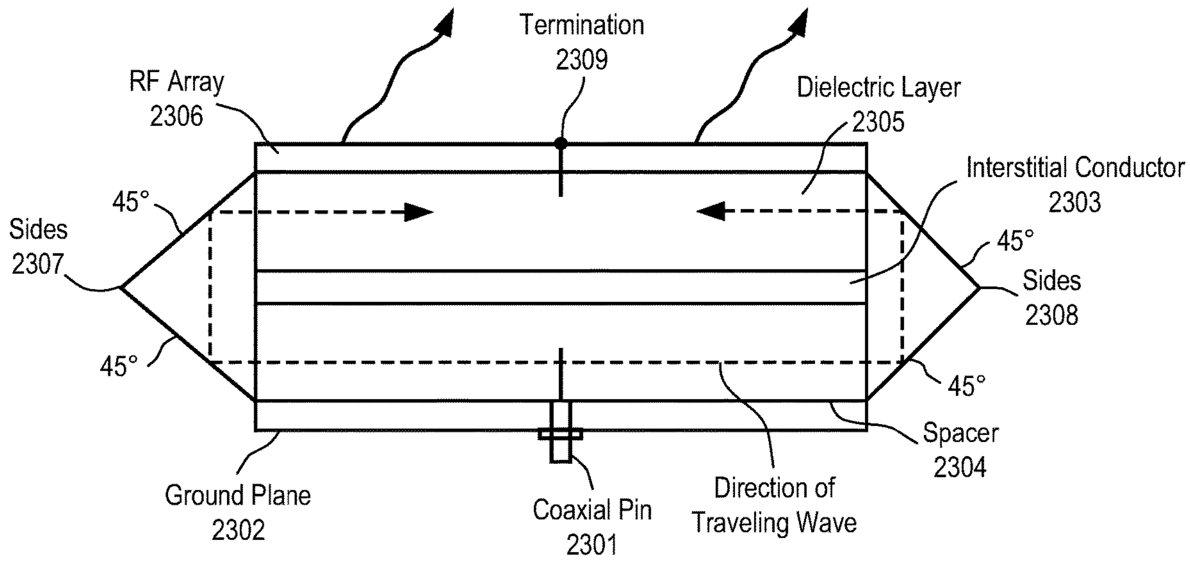
FIG. 23 illustrates a side view of one embodiment of a cylindrically fed antenna structure.

FIG. 23 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 23 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 23, a coaxial pin 2301 is used to excite the field on the lower level of the antenna. In one embodiment, coaxial pin 2301 is a 50Ω coax pin that is readily available. Coaxial pin 2301 is coupled (e.g., bolted) to the bottom of the antenna structure, which is conducting ground plane 2302.

Separate from conducting ground plane 2302 is interstitial conductor 2303, which is an internal conductor. In one embodiment, conducting ground plane 2302 and interstitial conductor 2303 are parallel to each other. In one embodiment, the distance between ground plane 2302 and interstitial conductor 2303 is 0.1-0.15". In another embodiment, this distance may be λ/2, where λ is the wavelength of the travelling wave at the frequency of operation.

Ground plane 2302 is separated from interstitial conductor 2303 via a spacer 2304. In one embodiment, spacer 2304 is a foam or air-like spacer. In one embodiment, spacer 2304 comprises a plastic spacer.

On top of interstitial conductor 2303 is dielectric layer 2305. In one embodiment, dielectric layer 2305 is plastic.

The purpose of dielectric layer 2305 is to slow the travelling wave relative to free space velocity. In one embodiment, dielectric layer 2305 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric layer 2305, such as periodic sub-wavelength metallic structures that can be machined or lithographically defined, for example.

An RF array 2306 is on top of dielectric layer 2305. In one embodiment, the distance between interstitial conductor 2303 and RF array 2306 is 0.1-0.15". In another embodiment, this distance may be $\lambda_{eff}/2$, where $\lambda_{eff}$ is the effective wavelength in the medium at the design frequency.

The antenna includes sides 2307 and 2308. Sides 2307 and 2308 are angled to cause a travelling wave feed from coax pin 2301 to be propagated from the area below interstitial conductor 2303 (the spacer layer) to the area above interstitial conductor 2303 (the dielectric layer) via reflection. In one embodiment, the angle of sides 2307 and 2308 are at 45° angles. In an alternative embodiment, sides 2307 and 2308 could be replaced with a continuous radius to achieve the reflection. While FIG. 23 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 2301, the wave travels outward concentrically oriented from coaxial pin 2301 in the area between ground plane 2302 and interstitial conductor 2303. The concentrically outgoing waves are reflected by sides 2307 and 2308 and travel inwardly in the area between interstitial conductor 2303 and RF array 2306. The reflection from the edge of the circular perimeter causes the wave to remain in phase (i.e., it is an in-phase reflection). The travelling wave is slowed by dielectric layer 2305. At this point, the travelling wave starts interacting and exciting with elements in RF array 2306 to obtain the desired scattering.

To terminate the travelling wave, a termination 2309 is included in the antenna at the geometric center of the antenna. In one embodiment, termination 2309 comprises a pin termination (e.g., a 50Ω pin). In another embodiment, termination 2309 comprises an RF absorber that terminates unused energy to prevent reflections of that unused energy back through the feed structure of the antenna. These could be used at the top of RF array 2306.

Figure 24:
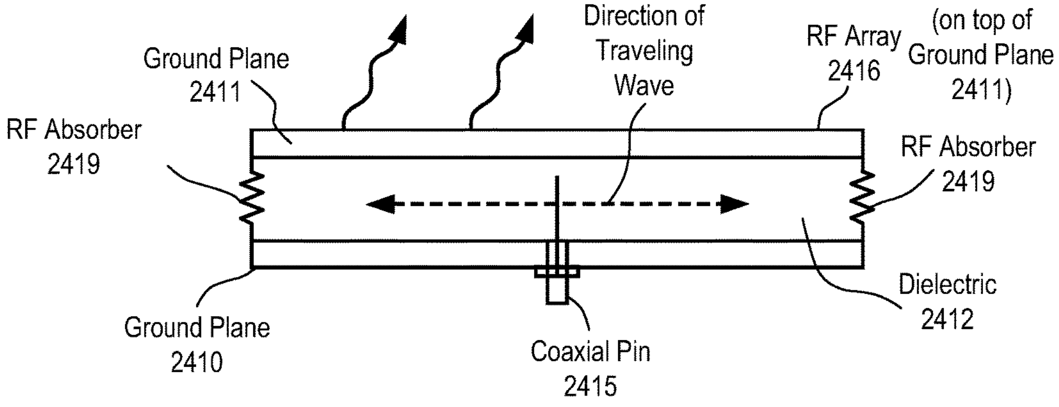
FIG. 24 illustrates another embodiment of the antenna system with an outgoing wave.

FIG. 24 illustrates another embodiment of the antenna system with an outgoing wave. Referring to FIG. 24, two ground planes 2410 and 2411 are substantially parallel to each other with a dielectric layer 2412 (e.g., a plastic layer, etc.) in between ground planes 2410, 2411. RF absorbers 2419 (e.g., resistors) couple the two ground planes 2410 and 2411 together. A coaxial pin 2415 (e.g., 50Ω) feeds the antenna. An RF array 2416 is on top of dielectric layer 2412 and ground plane 2411.

In operation, a feed wave is fed through coaxial pin 2415 and travels concentrically outward and interacts with the elements of RF array 2416.

The cylindrical feed in both the antennas of FIGS. 23 and 24 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 2306 of FIG. 23 and RF array 2416 of FIG. 24 include a wave scattering subsystem that includes a group of patch antennas (e.g., scatterers) that act as radiators. This group of patch antennas comprises an array of scattering metamaterial elements.

In one embodiment, the cylindrical feed geometry of this antenna system allows the unit cells elements to be positioned at forty-five-degree (45°) angles to the vector of the wave in the wave feed. This position of the elements enables control of the polarization of the free space wave generated from or received by the elements. In one embodiment, the unit cells are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

Cell Placement

Figure 25:
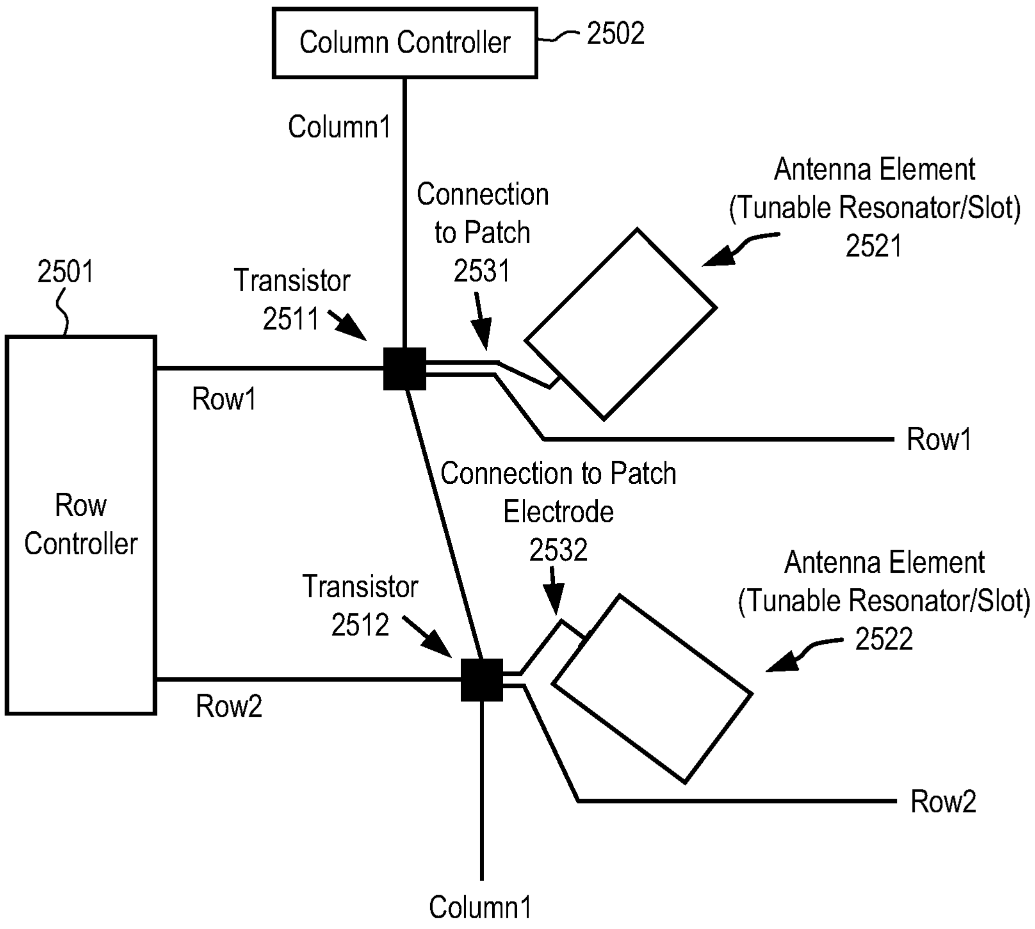
FIG. 25 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 25 illustrates one embodiment of the placement of matrix drive circuitry with respect to antenna elements. Referring to FIG. 25, row controller 2501 is coupled to transistors 2511 and 2512, via row select signals Row1 and Row2, respectively, and column controller 2502 is coupled to transistors 2511 and 2512 via column select signal Column1. Transistor 2511 is also coupled to antenna element 2521 via connection to patch 2531, while transistor 2512 is coupled to antenna element 2522 via connection to patch 2532.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 26:
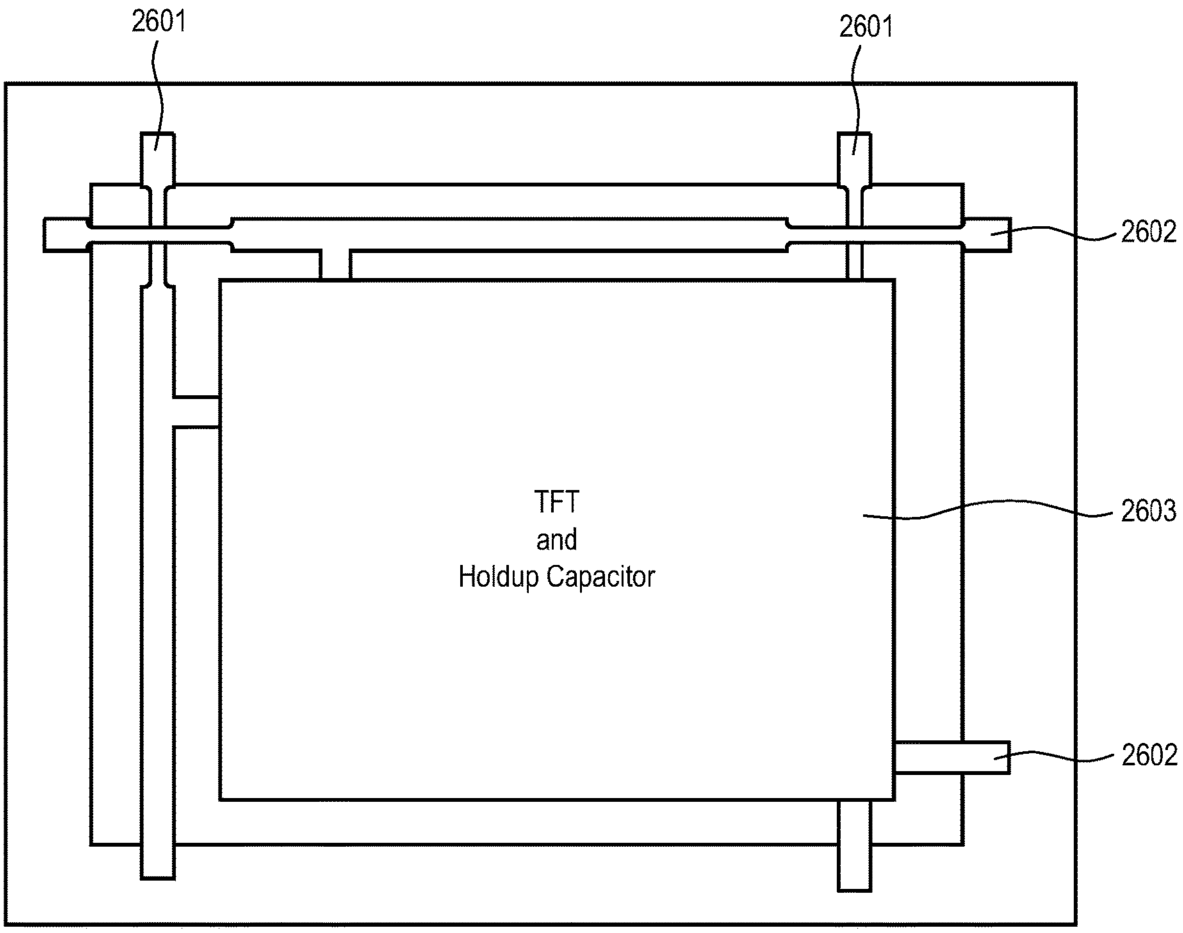
FIG. 26 illustrates one embodiment of a TFT package.

In one embodiment, a TFT package is used to enable placement and unique addressing in the matrix drive. FIG. 26 illustrates one embodiment of a TFT package. Referring to FIG. 26, a TFT and a hold capacitor 2603 is shown with input and output ports. There are two input ports connected to traces 2601 and two output ports connected to traces 2602 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 27:
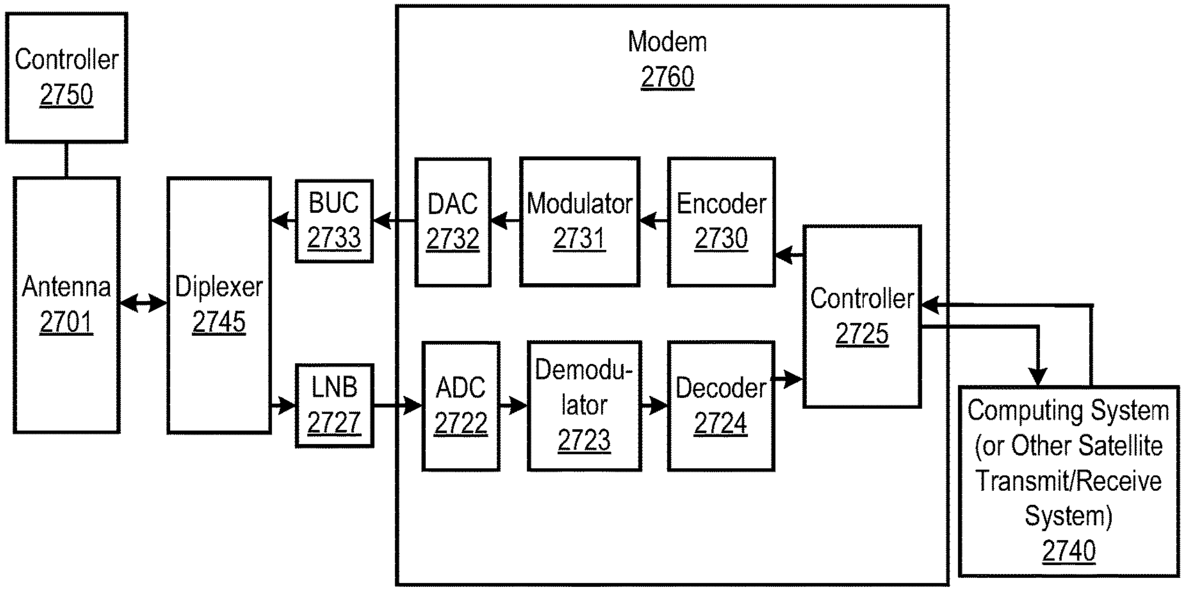
FIG. 27 is a block diagram of one embodiment of a communication system having simultaneous transmit and receive paths.

In another embodiment, the combined antenna apertures are used in a full duplex communication system. FIG. 27 is a block diagram of an embodiment of a communication system having simultaneous transmit and receive paths. While only one transmit path and one receive path are shown, the communication system may include more than one transmit path and/or more than one receive path.

Referring to FIG. 27, antenna 2701 includes two spatially interleaved antenna arrays operable independently to transmit and receive simultaneously at different frequencies as described above. In one embodiment, antenna 2701 is coupled to diplexer 2745. The coupling may be by one or more feeding networks. In one embodiment, in the case of a radial feed antenna, diplexer 2745 combines the two signals and the connection between antenna 2701 and diplexer 2745 is a single broad-band feeding network that can carry both frequencies.

Diplexer 2745 is coupled to a low noise block down converter (LNBs) 2727, which performs a noise filtering function and a down conversion and amplification function in a manner well-known in the art. In one embodiment, LNB 2727 is in an out-door unit (ODU). In another embodiment, LNB 2727 is integrated into the antenna apparatus. LNB 2727 is coupled to a modem 2760, which is coupled to computing system 2740 (e.g., a computer system, modem, etc.).

Modem 2760 includes an analog-to-digital converter (ADC) 2722, which is coupled to LNB 2727, to convert the received signal output from diplexer 2745 into digital format. Once converted to digital format, the signal is demodulated by demodulator 2723 and decoded by decoder 2724 to obtain the encoded data on the received wave. The decoded data is then sent to controller 2725, which sends it to computing system 2740.

Modem 2760 also includes an encoder 2730 that encodes data to be transmitted from computing system 2740. The encoded data is modulated by modulator 2731 and then converted to analog by digital-to-analog converter (DAC) 2732. The analog signal is then filtered by a BUC (up-convert and high pass amplifier) 2733 and provided to one port of diplexer 2745. In one embodiment, BUC 2733 is in an out-door unit (ODU).

Diplexer 2745 operating in a manner well-known in the art provides the transmit signal to antenna 2701 for transmission.

Controller 2750 controls antenna 2701, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 27 has a number of applications, including but not limited to, internet communication, vehicle communication (including software updating), etc.

With reference to FIGS. 1-27, it should be appreciated that other tunable capacitors, tunable capacitance dies, packaged dies, micro-electromechanical systems (MEMS) devices, or other tunable capacitance devices, could be placed into an aperture or elsewhere in variations on the embodiments described herein, for further embodiments. The techniques for mass transfer may be applicable to further embodiments, including placement of various dies, packaged dies or MEMS devices on various substrates for electronically scanned arrays and various further electrical, electronic and electromechanical devices.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:

one or more substrates;

one or more metal layers coupled to the one or more substrates to define a plurality of iris openings in a plurality of rings, groups of iris openings of the plurality of iris openings in each ring being oriented with differing rotations with respect to each other; and one or more tunable capacitance devices positioned within or across at least a portion of the iris opening, wherein the one or more tunable capacitance devices are oriented uniformly relative to differing rotations of iris openings across at least one portion of the antenna aperture.

2. The antenna of claim 1 wherein each of the one or more tunable capacitance devices comprises a discrete diode capacitively-coupled with a capacitor to the iris opening.

3. The antenna of claim 2 wherein the discrete diode is coupled, using at least a thru via, to one metal layer on one side of the iris opening.

4. The antenna of claim 2 wherein the discrete diode is coupled, using at least a bond pad, to one metal layer on one side of the iris opening.

5. The antenna of claim 2 wherein the discrete diode comprises:

a first terminal coupled, using at least a thru via, to a metal layer on one side of the iris opening, a second terminal, opposing the first terminal, coupled to a first electrode.

6. The antenna of claim 5 wherein the first electrode comprises a patch electrode.

7. The antenna of claim 2 wherein the discrete diode is controlled by a direct current (DC) voltage source.

8. The antenna of claim 1 wherein each the one or more tunable capacitance devices comprises first and second discrete diodes.

9. The antenna of claim 8 wherein the first and second discrete diodes are coupled, using bond pads, to metal layers of the one or more metal layers on one side of the iris opening.

10. The antenna of claim 9 wherein the one or more metal layers include a plurality of metal layers;

a first terminal of the first discrete diode is coupled to a first metal layer of the plurality of metal layers on a first side of an iris opening;

a second terminal of the first discrete diode, opposing the first terminal, is coupled to a second metal layer of the plurality of metal layers within the iris opening;

a first terminal of the second discrete diode is coupled to the second metal layer of the plurality of metal layers within the iris opening;

a second terminal of the second discrete diode, opposing the first terminal, is coupled to a third metal layer of the plurality of metal layers on a second side of an iris opening different than the first side of the iris opening.

11. The antenna of claim 1, wherein the antenna aperture comprises a plurality of segments, and one of the plurality of segments includes the at least one portion of the antenna aperture.

12. An antenna comprising:

an antenna aperture having one or more substrates with a plurality of antenna elements, wherein the antenna elements comprise:

an iris opening defined by one or more metal layers coupled to the one or more substrates;

a discrete tunable element capacitively-coupled across at least a portion of the iris opening, the discrete tunable element having first and second bond pads, the first bond pad coupled, using at least a thru via, to a metal layer on a first side of the iris opening, and the second bond pad coupled to a first electrode on a second side of the iris opening opposite the first side.

13. The antenna of claim 12 wherein the discrete tunable element comprises a discrete diode.

14. The antenna of claim 13 wherein the discrete diode is coupled with a capacitor across at least a portion of the iris opening.

15. The antenna of claim 12 wherein the first electrode comprises a patch electrode.

16. The antenna of claim 12 wherein the first and second bond pads are soldered to the thru via and first electrode, respectively.

17. An antenna comprising:

an antenna aperture having one or more substrates with a plurality of antenna elements, wherein the antenna elements comprise:

an iris opening defined by one or more metal layers coupled to the one or more substrates;

first and second discrete tunable elements capacitively-coupled across at least a portion of the iris opening, the first and second discrete tunable elements having first and second terminals, wherein the first terminal of the first tunable element is coupled to a first metal layer of the one or more metal layers on a first side of an iris opening;

the second terminal of the first tunable element, opposing the first terminal, is coupled to a second metal layer of the one or more metal layers within the iris opening;

the first terminal of the second tunable element is coupled to the second metal layer of the one or more metal layers within the iris opening;

the second terminal of the second tunable element, opposing the first terminal, is coupled to a third metal layer of the one or more metal layers on a second side of an iris opening different than the first side of the iris opening.

18. The antenna of claim 17 wherein the first and second discrete tunable elements each comprises a discrete diode.

19. The antenna of claim 17 wherein the first and second terminals of the first tunable element and the first and second terminals of the second tunable elements are coupled via bond pads to the one or more metal layers.

20. The antenna of claim 17 wherein the first, second and third metal layers comprise a same metal layer.

* * * * *